US005416395A

United States Patent [19]

Hiramatsu et al.

[11] Patent Number: 5,416,395

[45] Date of Patent: May 16, 1995

[54] CARRIAGE DRIVE CONTROL FOR A PRINTER

[75] Inventors: Soichi Hiramatsu, Yokohama; Takao Aichi, Tokyo, both of Japan

[73] Assignee: Canon Kabushiki Kaisha, Tokyo, Japan

[21] Appl. No.: 762,363

[22] Filed: Sep. 19, 1991

[30] Foreign Application Priority Data

Sep. 21, 1990 [JP] Japan .................................. 2-250286
Sep. 21, 1990 [JP] Japan .................................. 2-250287

[51] Int. Cl.$^6$ ............................................ G05B 11/00

[52] U.S. Cl. ...................................... 318/600; 318/603; 318/568.18; 318/592; 318/597; 318/696; 388/811; 388/829

[58] Field of Search ...................... 318/53, 59, 61, 268, 318/600–603, 568.17–568.18, 590–598, 685, 696; 388/811, 829

[56] References Cited

U.S. PATENT DOCUMENTS

| | | | |
|---|---|---|---|
| 3,579,070 | 5/1971 | Crocker et al. | 318/597 X |
| 4,270,868 | 6/1981 | Morgan et al. | 400/320 |
| 4,313,074 | 1/1982 | Nomura et al. | 318/608 |
| 4,313,124 | 1/1982 | Hara . | |
| 4,345,262 | 8/1982 | Shirato et al. . | |
| 4,415,911 | 11/1983 | Tazaki | 346/140 R |
| 4,459,600 | 7/1984 | Sato et al. . | |
| 4,463,359 | 7/1984 | Ayata et al. . | |
| 4,506,201 | 3/1985 | Tsuneki | 318/603 |
| 4,558,333 | 12/1985 | Sugitani et al. . | |
| 4,723,129 | 2/1988 | Endo et al. . | |
| 4,739,230 | 4/1988 | Sonobe et al. | 318/301 |
| 4,740,796 | 4/1988 | Endo et al. . | |
| 4,832,518 | 5/1989 | Moriyama | 400/322 |
| 4,928,050 | 5/1990 | Torisawa et al. . | |
| 4,963,808 | 10/1990 | Torisawa et al. . | |
| 5,029,264 | 7/1991 | Ito et al. . | |

FOREIGN PATENT DOCUMENTS

| | | |
|---|---|---|
| 0442713 | 8/1991 | European Pat. Off. . |
| 54-56847 | 5/1979 | Japan . |
| 59-123670 | 7/1984 | Japan . |
| 60-71260 | 4/1985 | Japan . |
| 62-193548 | 8/1987 | Japan . |
| 62-193549 | 8/1987 | Japan . |
| 63-162258 | 7/1988 | Japan . |
| 35181 | 1/1991 | Japan . |

OTHER PUBLICATIONS

Research Disclosure, "Homing Device for a Printer Carrier Driven by a Stepper Motor", p. 232, Apr. 1988.

*Primary Examiner*—William M. Shoop, Jr.
*Assistant Examiner*—Brian Sircus
*Attorney, Agent, or Firm*—Fitzpatrick, Cella, Harper & Scinto

[57] ABSTRACT

The invention relates to a recording apparatus for effecting recording on a recording material. The recording apparatus comprises a stepping motor, a recording head capable of reciprocating along the recorded material by a drive force of the stepping motor to effect recording on the recording material, an angular position detector for detecting a rotated angular position of a rotor of the stepping motor, a controller for controlling drive of the stepping motor in a closed-loop manner dependent on the detected result of the detector, a controller for operating the stepping motor in a mode of stepwise motor drive, a movement position detector for detecting a movement position of the recording head, and switching circuitry for switching over between the closed-loop control and the stepwise motor drive dependent on the detected value of the movement position detector.

7 Claims, 18 Drawing Sheets

CARRIAGE DRIVE CONTROL FOR A PRINTER

BACKGROUND OF THE INVENTION

1. Field of the Invention

The present invention relates to a recording apparatus, and more particularly to a serial type recording apparatus in which recording is made while moving a recording head relative to a recorded material by using a brushless motor, e.g., a stepping motor, as a drive power source.

2. Related Background Art

In brushless motors, it is usual that a Hall device or the like is used to perform position detection of a rotor's magnetic pole for control of current supply, and an optical or magnetic encoder is used to perform speed detection of the rotor.

Such brushless motors have, however, suffered from the following problems.

(1) Alignment is required between a stator's magnetic pole and the Hall device; and (2) With the Hall device used to carry out switching of the current supply, the relative position relationship between the Hall device and the stator is uniquely determined, thus making a current supply method for the motor fixed. Between the case of so-called 180° current supply control and the case of so-called 90° current supply control, for example, the position of the Hall device is electrically different 45° relative to the stator's magnetic pole. In order to perform two modes of current supply control using a single motor, therefore, the number of Hall devices must be doubled and those Hall devices must be arranged at positions respectively suitable for the different modes of current supply control.

Although Japanese Patent Laid-Open No. 62-193548 and No. 62-193549, for example, propose a stepping motor to perform control of the current supply using an encoder output, those publications disclose only the structure of a motor, per se, with an encoder mounted at a predetermined location, and nothing is referred to a drive control circuit for the motor, a control method, etc.

Therefore, U.S. Pat. No. 4,963,808 proposes a motor controller for a stepping motor in which an encoder having detected portions integer times as many as the number of magnetic poles of the rotor is fixed to a rotor shaft, and the number of the detected portions of the encoder having passed over during rotation of the rotor is counted at a predetermined location on the stator side, thereby switching the mode of current supply to a stator coil when the counted value comes into match with a predetermined value.

Meanwhile, drive control of stepping motors have been conventionally made under simple open-loop control of the number of drive pulses for the motor and the frequency of those drive pulses. In the case of using the stepping motor as a carriage drive motor and driving the motor under open-loop control, however, piercing harsh noises occur due to rotor vibrations of the stepping motor, particularly of the hybrid type, while the carriage is being driven to run. Further, when the carriage is started, stopped and reversed in its driving direction, i.e., when the stepping motor is started, stopped and reversed in its rotating direction, large noises like bangs occur because the stepping motor is started and stopped while undergoing vibrations. Those noises raise a problem specially in quiet printers such as ink jet printers represented by bubble jet printers.

In view of the above, U.S. Pat. No. 4,928,050 proposes a recording apparatus in which a stepping motor is used as a drive power source to move a recording head for recording scan, the apparatus comprising detection means for detecting a rotated angular position of a rotor of the stepping motor, and control means for controlling drive of the stepping motor in a closed-loop manner dependent on the detected result of the detection means.

The closed-loop control of the stepping motor, however, requires an encoder for detecting the rotated angular position of the rotor, and also necessitates alignment to be made during assembly of the motor between magnetic poles of the rotor and magnetic poles of the encoder (e.g., slits of a magnetic or optical encoder). The reason of necessitating such alignment is that phase switching of the motor is synchronized with output pulses of the encoder. Unless the alignment is performed with a satisfactory degree of accuracy, the motor may fail to rotate or may rotate at different speeds dependent on the direction.

On the other hand, if the number of output pulses per rotation of the encoder is increased to raise resolution for each pulse, the above alignment can be dispensed with. In the case of a PM type stepping motor which makes a turn through 48 steps, for example, a rotor has 24 magnetic poles. If the encoder is set to output 288 pulses per rotation, there is produced an output of 12 pulses for each of the rotor's magnetic poles. Since a deviation between the center of the rotor's magnetic pole and the center of the encoder's magnetic pole, as resulted when mounting the encoder to the rotor shaft at random, is a half of the pulse interval at maximum, the deviation is within a range of +4.2%. A corresponding deviation of the timing in switching of the excitation current is reduced down to a negligible value.

In that case, it must be decided at the beginning which magnetic pole of the encoder is made correspondent to the rotor's magnetic pole. To this end, a current is first supplied to the motor coil over a predetermined period of time. Subsequently, when the rotor is slightly rotated upon excitation of the motor coil due to the current supply and then stopped, the encoder's magnetic pole confronting the rotor's magnetic pole is selected as a reference. The other encoder's magnetic poles may be successively selected with an interval of 12 pulses, starting from the reference magnetic pole first determined.

The above-stated initialization of encoder pulses must be carried out prior to movement of the motor. In other words, when such a stepping motor is used as a carriage drive motor of a serial printer, it is required to perform an initial operation when a current is applied to the machine body.

With an aim to implement such an initial operation, U.S. Ser. No. 413,473 filed on Sep. 27, 1989, proposes a recording apparatus in which a stepping motor is used as a drive power source to move a recording head for recording scan, the apparatus comprising detection means for detecting a rotated angular position of a rotor of the stepping motor, and control means for controlling drive of the stepping motor in a closed-loop manner dependent on the detected result of the detection means, and for making an operation to drive the stepping motor and hold the rotor under current control with pulse width modulation during the initial process which includes a step of driving the stepping motor under open-loop control.

Meanwhile, some ink jet recording apparatus, for example, are arranged to carry out a wiping operation through engagement with the ink discharge port defining surface of a recording head upon running of a carriage, to thereby clean the head. For the purpose of such a wiping operation, the carriage is required to run at a predetermined speed. Specifically, it is usually required for the carriage to run at a speed considerably lower than that during the running for recording. Also, the running distance through which the carriage is to be run for that purpose is required to be as short as possible from the standpoints of reducing the apparatus size and improving a total printing speed.

Realizing a predetermined speed certainly at a predetermined position in such a short distance is very difficult under closed-loop control using a stepping motor.

There is further known a recording apparatus which has a drive force transmission switching mechanism capable of switching a single drive power source so as to produce drive forces for plural kinds of operations, with a view of reducing the cost. Japanese Patent Laid-Open Application 3-5181 discloses a mechanism for switching the drive force of a sheet feed motor to be transmitted for sheet feeding, drive of an auto sheet feeder, drive of restoring means in an ink jet recording apparatus, and so forth, the mechanism being arranged to switch transmission paths of the drive force dependent on the stop position of a carriage. The recording apparatus having such a mechanism may suffer from the problem that a control system becomes complicated if it is driven under closed-loop control, because the carriage is often stopped for a long time at a predetermined position or operated to reciprocate over a short distance at a predetermined speed.

In a conventional recording apparatus, a stepping motor is driven by switching excitation at the predetermined timing using a predetermined current value. In need of large drive torque, for example, the drive torque is increased by setting the current value to be large or delaying the timing to switch excitation. As regards to an excitation method, the drive torque can be increased by adopting a 2-phase excitation technique rather than a 1-phase excitation technique. In such 1-phase and 2-phase excitation techniques, the torque produced at the time of switching the phase is constant if the current value for each phase is kept constant.

In need of fine accuracy for the stop position, by way of example, adopting 1-2-phase excitation drive or half-step drive can theoretically improve resolution of the stop position twice as much as that obtained by 1-phase or 2-phase excitation drive. Taking a motor which makes a turn through 48 steps as one example, the 1-phase or 2-phase excitation drive provides resolution of 1 step=7.5° and the 1-2-phase excitation drive provides resolution of 1 step=3.75°. When the 1-2-phase excitation drive is used to provide higher resolution, there arises the problem that since the produced torque is larger during the 2-phase excitation than during the 1-phase excitation, the torque during the 2-phase excitation becomes too large if the torque necessary for stopping is set to be suitable for the 1-phase excitation and, conversely, the torque during the 1-phase excitation becomes too small to keep stability if the torque necessary for stopping is set to be suitable for the 2-phase excitation.

Further, the 1-2-phase excitation drive is sometimes adopted so as to provide smoother rotation than the 2-phase excitation drive and to eliminate noises. This case also is accompanied with the problem that fluctuations occur in rotation due to a torque difference between the 1-phase excitation drive and the 2-phase excitation drive, and these torque fluctuations necessarily generate noises.

Moreover, if it is intended to produce sufficient drive torque, taking into account the fact that the motor tends to be out of synchronism during the 1-phase excitation drive due to lack of the drive torque, the torque during the 2-phase excitation becomes too large, thereby causing the problem of noises, etc.

SUMMARY OF THE INVENTION

An object of the present invention is to solve the above-stated disadvantages in the prior art, and to drive a carriage with high accuracy by switching a mode between closed-loop drive and stepwise motor drive.

Another object of the present invention is to enable adjustment of drive conditions for the stepwise motor drive.

Other objects of the present invention will be apparent from practical embodiments described below.

DESCRIPTION OF THE PREFERRED EMBODIMENTS

Hereinafter, preferred embodiments of the present invention will be described in a detailed and concrete way with reference to the drawings.

(Construction of Entire Apparatus)

Figure 1:
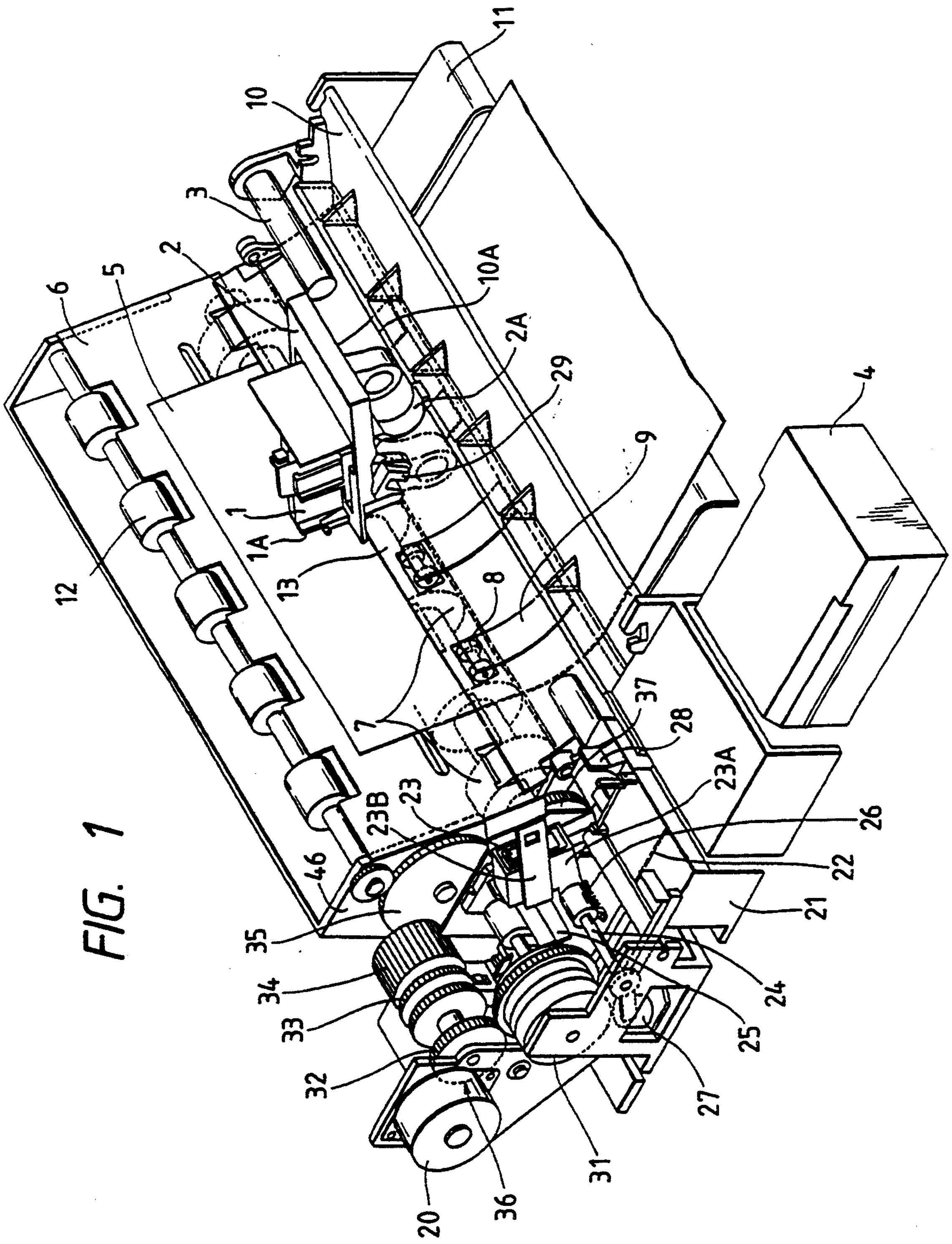
FIG. 1 is a perspective view showing one exemplified construction of an ink jet recording apparatus to which the present invention is applied.

FIG. 1 shows an exemplified ink jet recording apparatus as one embodiment of the present invention. In FIG. 1, denoted by reference numeral 1 is a recording head mounted on a carriage 2. The carriage 2 is driven by a carriage drive motor (not shown in FIG. 1), described later in connection with FIGS. 7A and 7B, through a timing belt (also not shown) stretched between the carriage and an idler pulley so that the carriage is reciprocated along a guide shaft 3 with the motor being rotated forwardly and reversely. The recording head 1 is supplied with ink from an ink cartridge 4 via an ink tube (not shown), and the ink is discharged from ink discharge ports (not shown) toward a material on which information is to be recorded, e.g., a record sheet 5, while the carriage 2 is moving from the left to the right. Discharge means for the recording head can be practiced by adopting a technique to cause status changes, inclusive of quick formation and contraction, of air bubbles in a liquid with thermal energy arid to discharge the liquid in the form of droplets upon the formation of the air bubbles (preferably, the means having an electro - thermal transducer as a component), as disclosed in U.S. Pat. Nos. 4,723,129 and 4,459,600.

Denoted by 6 is a plate-like fixed platen for holding the record sheet 5 at a position opposite to the discharge surface of the recording head 1 with a predetermined gap left therebetween, 7 is a feed roller for feeding the record sheet 5, 8 is a pinch roller coming into pressure contact with the associated feed roller 7 so that the pinch roller is rotated in following relation to the feed roller 7 while holding the record sheet 5 therebetween, and 9 is a pinch roller holder for applying a press force to the associated pinch roller 8, the holder 9 being formed of a stainless sheet or the like and biasing the pinch roller 8 toward the feed roller 7 with its resilient force. 10 and 11 are respectively an upper guide and a lower guide for holding the record sheet 5 to be set by hands and introducing it into the nips between the feed rollers 7 and the pinch rollers 8.

A guide rail 10A is provided on the upper surface of the upper guide 10, and a leaf spring 2A provided on the lower surface of the carriage 2 is held in such a manner as able to slide along the guide rail 10A. A resilient force of the leaf spring 2A urges the carriage 2 toward the fixed platen 6 so that part of the carriage 2 is slidably abutted against a sheet retainer plate 13 provided in front of the platen 6, thereby keeping a predetermined gap between the ink discharge surface 1A of the head 1 and the record sheet 5. Incidentally, the location at which the part of the carriage 2 is abutted against the sheet retainer plate 13 is near a portion of the sheet retainer plate 13, on the rear side, with which the feed roller 7 comes into contact. As the sheet retainer plate 13 is moved back upon the passage of the record sheet 5, the carriage 2 is also moved back correspondingly. Therefore, a recorded image of high quality can be formed by keeping the aforesaid gap between the ink discharge surface 1A and the record sheet 5 at a predetermined value regardless of sheet thickness.

The record sheet 5 fed by the feed rollers 7 and the pinch rollers is held by the fixed platen 6 inclined rearwardly at an angle of about 30 degrees, allowing a user to easily look at the recorded results. Then, the record sheet 5 on which information has been recorded is sandwiched between discharge rollers 12 and spurs 12B held in pressure contact with the discharge rollers 12 as shown in FIG. 2, following which the record sheet 5 is discharged into a stacker 14.

Figure 2:
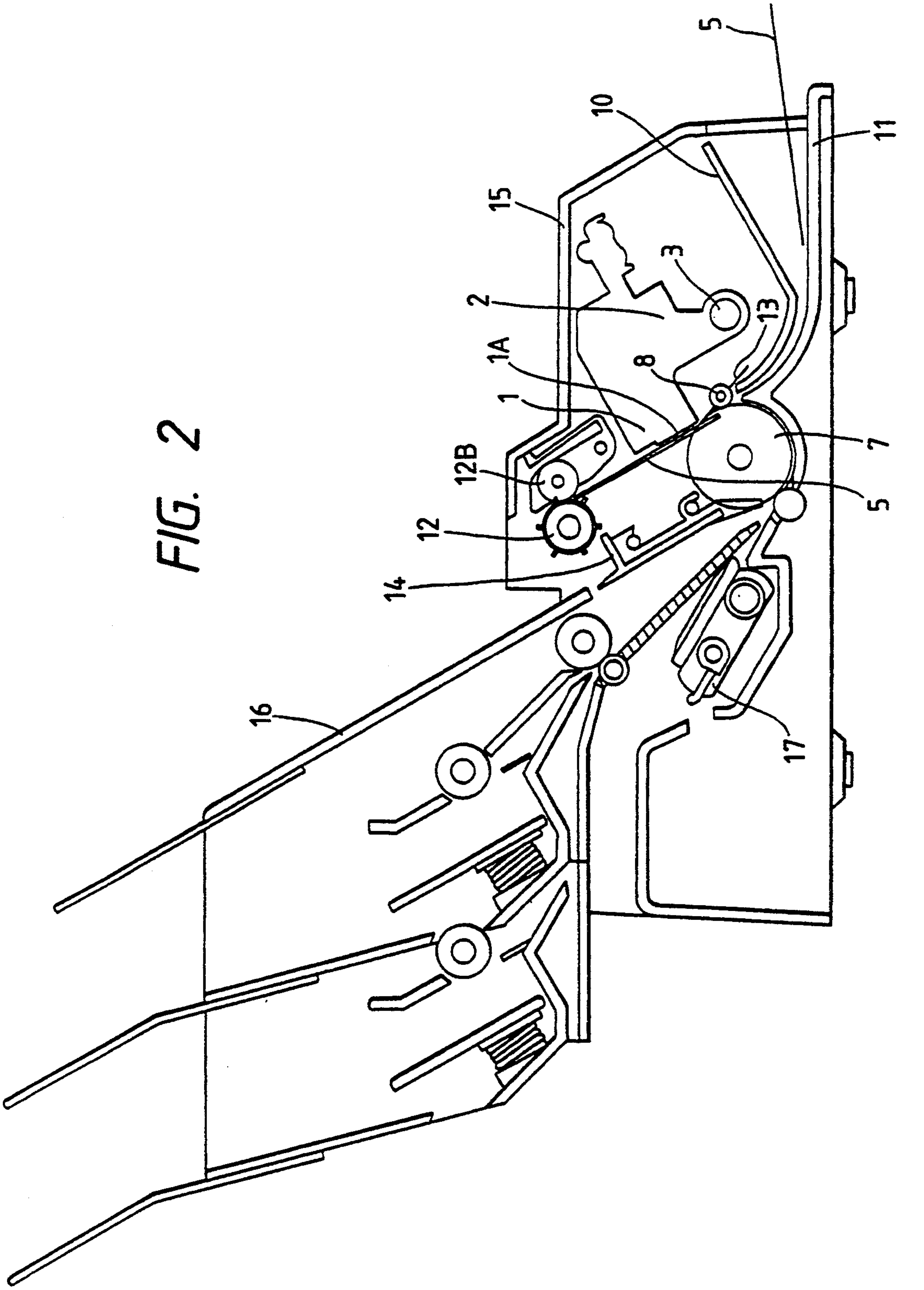
FIG. 2 is a sectional view of tile recording apparatus of FIG. 1 equipped with an ASF (Auto Sheet Feeder)

FIG. 2 shows the recording apparatus equipped with an outer cover 15 and an auto sheet feeder (ASF) 16. The record sheet can be not only set by an operator from the front side, but also supplied through the ASF 16 on the rear side. Additionally, recording can further be made on continuous paper by using a pin feed tractor 17. Moreover, a heater may be provided on the rear surface of the fixed platen 6 to cope with ink that is hard to dry.

There will now be explained an ink supply device, a restoring device, a sheet feed device and others according to this embodiment. These devices are all concentratedly disposed on the left side of a recording area, as viewed in FIG. 1, to simply a drive transmission mechanism in order to achieve a compact installation space with a drive power source shared by all the devices. Denoted by 20 is a feed motor provided as the drive power source. As described later, the feed motor 20 can drive the feed rollers 7 and the discharge rollers 12, as well as the ASF 16. It can further perform a series of restoring operations by the restoring device.

Denoted by 21 is a cartridge insertion entrance, and 22 is a hollow needle capable of sticking into the ink cartridge 4, when it is inserted, whereby the ink is supplied to the recording head 1 via a tube and a remaining ink amount detector (both not shown). The restoring device comprises a cap member 23, a cap guide shaft 24 for movably holding a cap carrier 23A on which the cap member 23 is mounted, a rail 25 for guiding the cap member 23 so that the cap member is operated to move toward the ink discharge surface 1A of the recording head 1, a spring 26 for biasing the cap member 23 toward its initial position on the right side, an ink suction pump 27, etc.

The cap carrier 23A has an arm 23B projecting into a travel path of the carriage 2. When the carriage 2 is moved leftward from the position shown in FIG. 1 for returning to its initial position, part of the carriage 2 engages the upper portion of the arm 23B so that the arm 23B is further moved leftward together with the cap member 23. Reference numeral 28 is a fixed shutter for detecting a reference position. When the carriage 2 is led to the initial position, the fixed shutter 28 is detected by a transmission type sensor (home position sensor) 29 provided on the carriage 2 to determine that the carriage reaches the initial position. During subsequent movement, the ink discharge surface 1A is capped by the cap member 23.

In the restoring operation after such capping, a negative pressure is produced in the cap member 23 by driving of the pump 27 connected to the cap member 23 via a tube (not shown), whereupon the ink is sucked from a nozzle of the recording head 1. That restoring operation is performed by the feed motor 20 through switching of transmission paths made by drive force switching means described later. 31 numeral is a pump cam for driving the pump 27, 32 is a pump output gear, 33 and 34 are an ASF output gear and a sheet feed output gear which are provided coaxially with the pump output gear 32, respectively, and 35 is an idler gear held in mesh with a gear train 36 and capable of rotating the feed rollers 7 via a feed gear 37.

Incidentally, 48 is a wiper (blade) fixedly provided to extend perpendicularly to the running direction of the carriage 2 and held in engagement with the discharge port defining surface of the recording head 1 for cleaning it while the carriage is running.

(Switching Mechanism)

A mechanism for switching operations by the feed motor 20 will be explained below with reference to FIGS. 3 and 4. Note that although a gear is used as a transmission member in the following embodiment, the transmission member may have any other form than the gear.

Figure 3:
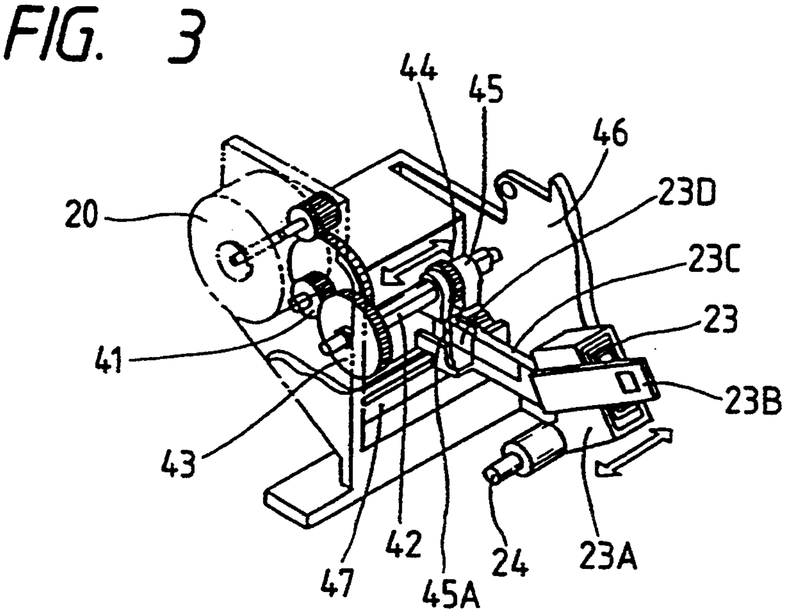
FIGS. 3 and 4 are perspective views for explaining a construction of a drive gear switching mechanism according to one embodiment of the present invention.

In FIG. 3, denoted by 41 is an idler gear for transmitting a drive force of the feed motor 20 to a drive gear 43 on a slide gear shaft 42. The slide gear shaft 42 has a D-shape in its cross-section and a slide gear 44 is held by a slide holder 45 to be rotatable together therewith. More specifically, the slide holder 45 has a bifurcated leg 45A extending downward, as shown in FIG. 4, and the leg 45A is fitted in a groove member 47 supported by a frame 46 in parallel to the gear shaft 42. Therefore, as the leg 45A is moved along the groove member 47, the slide gear 44 moves together with the slide holder 45. 23C Numeral is a second arm projecting from the cap carrier 23A toward the groove member 47, and 23D is a leaf spring held at the distal end of the second arm 23C, the leaf spring 23D being sandwiched between the bifurcated parts of the leg 45A of the slider holder 45.

When the cap member 23 is moved leftward by being engaged with the carriage 2 as described later, the slide holder 45 is also moved in the same direction via the leaf spring 23D, thereby always keeping the slide gear 44 at a position corresponding to the cap member 23. Then, as shown in FIG. 4, a module of gear train 36 similarly supported on the frame 46 and capable of meshing with the slide gear 44 is disposed over the slide gear 44.

Of the gear train 36, a gear disposed at the rightmost position is the sheet feed output gear 34 comprising a pair of large gear 34A and small gear 34B. The large gear 34A is meshed with the slide gear 44 and the small gear 34B is meshed with a discharge roller gear 12A via the idler gear 35. Under a condition of the sheet feed output gear 34 being in mesh with the slide gear 44, the feed motor 20 can rotate the feed rollers 7 and the discharge rollers 12 forwardly or reversely via the feed gear 37 and the discharge roller gear 12A.

Figure 4:
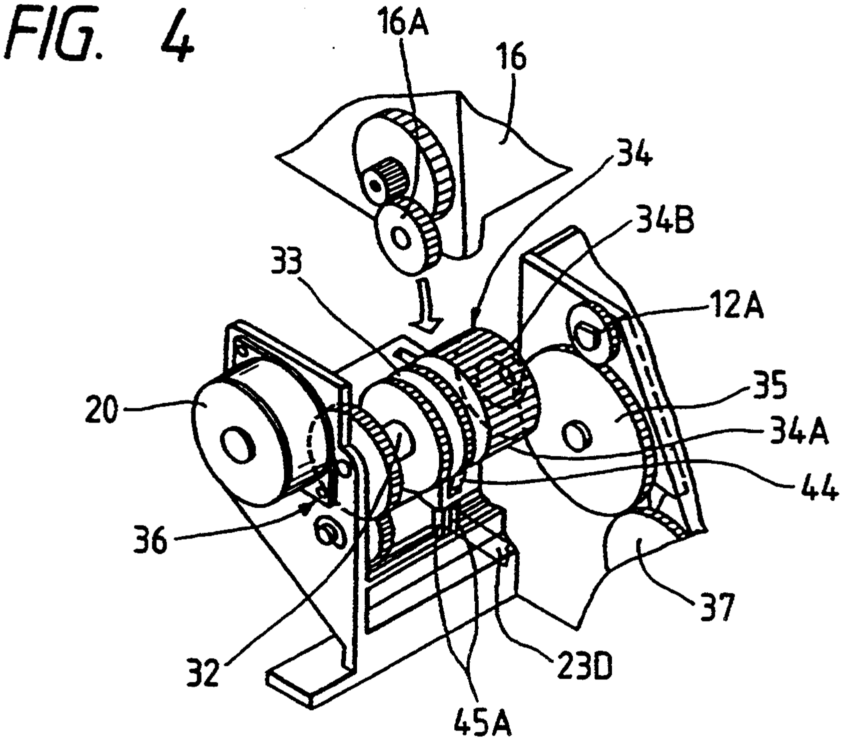

Further, in FIG. 4, the ASF output gear 33 has the same number of teeth and module as the large gear 34A coaxially therewith, and is meshed with both the slide gear 44 and an input gear 16A of the ASF 16 dependent on a moved position of the slide gear 44. Accordingly, under a condition of the slide gear 44 being in mesh with the ASF output gear 33, the input gear 16A can be rotated forwardly or reversely. By way of example, the forward rotation of the input gear 16A enables to feed the sheet through the ASF 16, whereas the reversed rotation thereof enables highly functional operations such as selection of 1 and 2 bins.

Figure 5A:
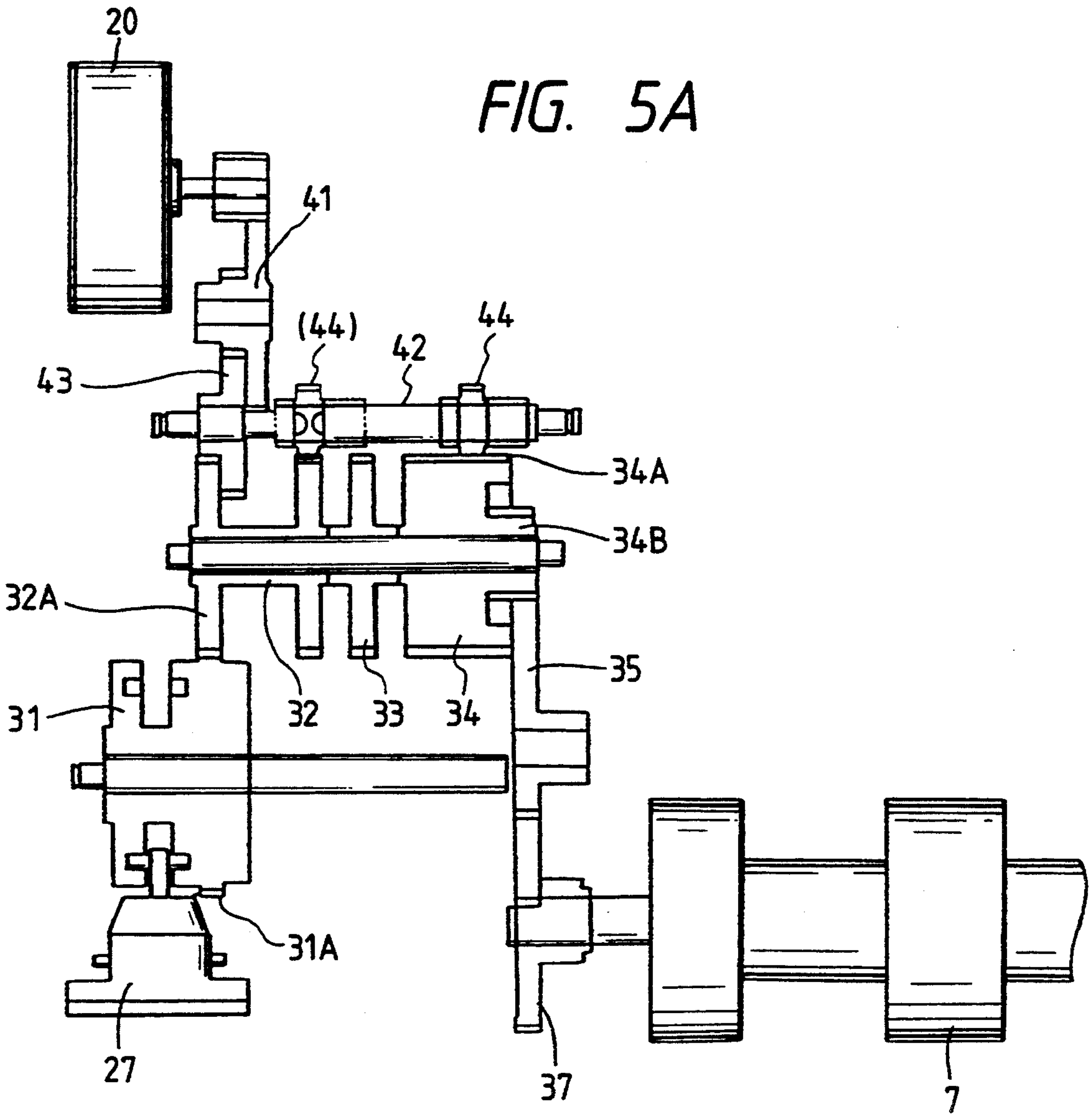
FIG. 5A is a constructional diagram of the drive gear switching mechanism shown in FIGS. 3 and 4.
Figure 5B:
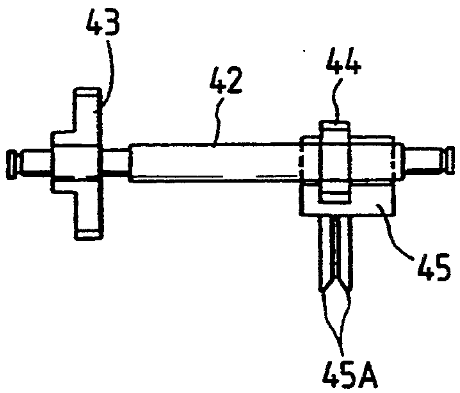
FIG. 5B is an explanatory view showing a disassembled slide gear shaft shown in FIG. 5A, FIGS. 6A to 6C are explanatory views showing engagement relationships between a carriage and a cap carrier according to one embodiment of the present invention.

The pump output gear 32 disposed at the left end of the gear train 36 in FIG. 4 can be also meshed with the slide gear 44 in its leftmost moved position (indicated by two-dot-chain lines) as shown in FIG. 5A, and one gear 32A of the pump output gear 32 is held in mesh with a drive gear 31A of the pump cam 31. Therefore, when the slide gear 44 is moved into such a leftmost position, it is possible to drive the pump cam 31 by the feed motor 20 and cause the pump 27 to effect a pumping operation with rotation of the cam 31. In short, as explained above, depending on the stop position of the carriage 2, the drive force of the feed motor 20 can be transmitted via the slide gear 44 to any of the sheet feed output gear 34, the ASF output gear 33 and the pump output gear 32, thereby carrying out the corresponding operation.

There will now be described in detail the operation that when the carriage 2 is moved leftward out of the recording area, the cap carrier 23A is also moved on the moved position of the carriage 2, whereupon the slide gear 44 is meshed with any of the above output gears dependent on the movement of the cap carrier 23A. At the time of a switching operation for the output gears, the leaf spring 23D interposed at the joint portion between the cap carrier 23A and the slide holder 45 serves as a damper.

Figures 6A, 6B, 6C:
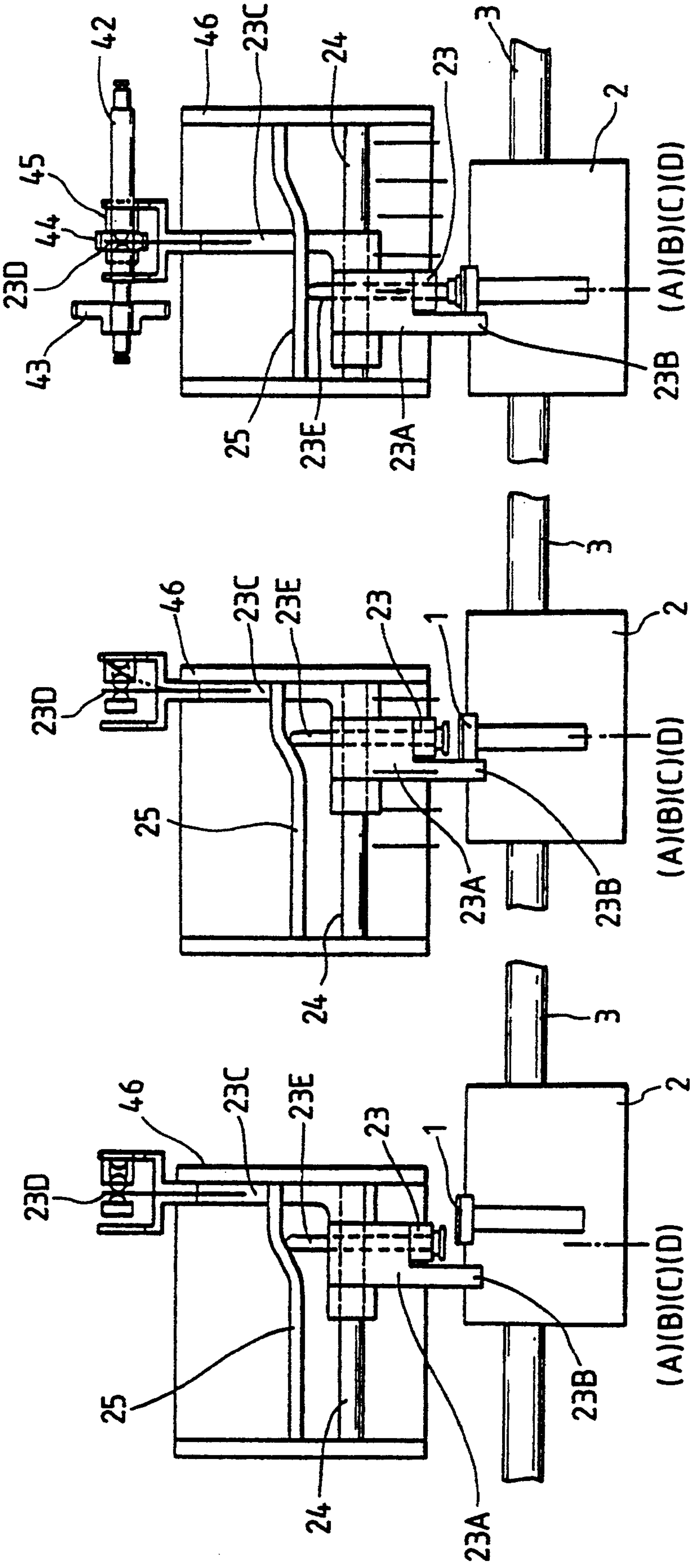

Assuming now that the carriage 2 is moved leftward from the recording area on the right side in FIG. 1 and further moved from the position shown in FIG. 6A to the position shown in FIG. 6B, the recording head 1 engages the arm 23B of the cap carrier 23A, enabling the cap carrier 23A to be moved together along the guide shaft 24 thereafter. In FIGS. 6A to 6C, (A) to (D) represent four positions which the cap carrier 23A can take, while holding the cap member 23, together with the slide holder 45 and the slide gear 44. At the positions (A) to (C) of those four positions, as shown in FIG. 6C by way of example, the cap member 23 is pushed toward the recording head 1 via an actuator arm 23E thereof which is guided along the rail 25, for keeping the recording head capped. The position (D) represents a standby position allowing the sheet to be fed during the recording. Specifically, when the carriage 2 is at the position (D) as shown in FIG. 6B, the slide gear 44 is meshed with the sheet feed output gear 34, though not shown in FIG. 6B, so that the feed motor 20 can feed the sheet.

At the position (D), the recording head faces the cap member with a space therebetween and preliminary discharge of ink, which has no relation with the recording, can be performed upon an electric signal being applied to the electro - thermal transducer of the recording head. In this embodiment, the ink is preliminarily discharged at the start of printing and when a period of standby time continues for one minute during the recording.

Next, when the carriage 2 is further shifted leftward from the position (D), the slide gear 44 is disengaged from the sheet feed output gear 34 and meshed with the ASF output gear 33 at the position (B). On this occasion, if any deviation exists in tooth phase between the two gears, the slide gear 44 may not smoothly mesh with the ASF output gear 33. By forcibly shifting the cap carrier 23A up to a position corresponding to the position (B) in spite of such an interference, however, the difference in movement amount resulted from that the slide gear 44 has not properly meshed with the ASF output gear 33 is absorbed by flexing of the leaf spring 23D. Upon the feed motor 20 being driven thereafter, the slide gear 44 is driven via the drive gear 43 as shown in FIG. 3 and meshed with the ASF output gear 33 when their tooth phases come into match with each other, for enabling to drive the ASF output gear 33.

Moreover, at the time such as immediately after the sheet has been fed with the slide gear 44 held in mesh with the sheet feed output gear 34, the slide gear 44 may not be easily disengaged from the sheet feed output gear 34 because their teeth are tightly fitted to each other and a friction force acts therebetween. In this case, it is also possible to temporarily hold that caught condition by flexing of the leaf spring 23D and eliminate the friction force between the teeth of the two gears by rotating the feed motor 20 reversely.

The position (A) represents a position, shown in FIG. 6C, to perform the restoring operation such as pumping. In this position, the slide gear 44 can be meshed with the pump output gear 32, allowing one gear 32A of the pump output gear 32 to drive the pump 27 via the pump cam 31 as shown in FIG. 5A. Additionally, the position (C) represents a position where the recording head 1 is on standby while being capped. It is a matter of course that the sheet can also be fed in the position (C).

(Carriage Drive Motor)

Figure 7A:
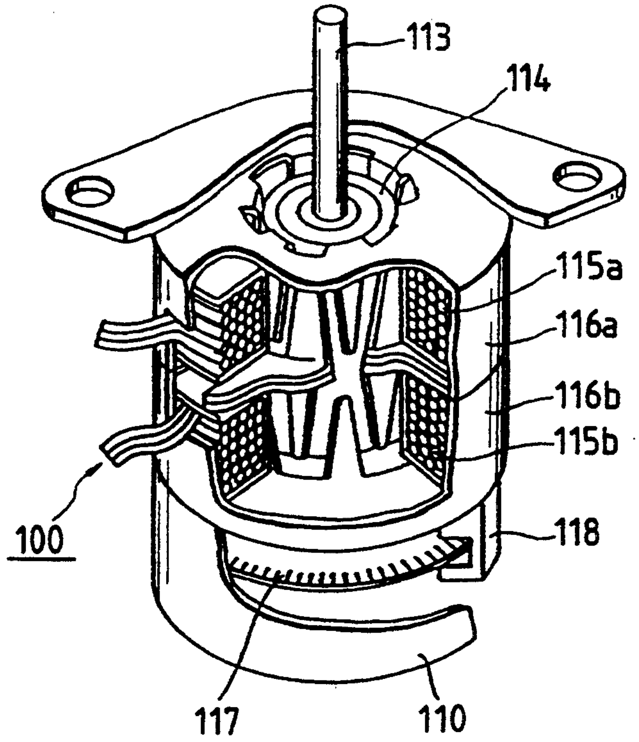
FIGS. 7A and 7B are a perspective view, partially broken away, and a sectional view showing one exemplified construction of a carriage drive motor according to one embodiment of the present invention, respectively.
Figure 7B:
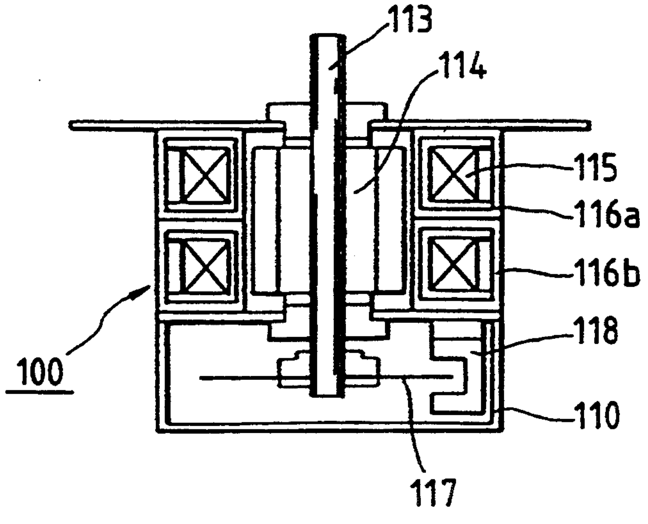

FIGS. 7A and 7B show the internal structure, in section, of a carriage drive motor 100 according to one embodiment of the present invention, which is driven under the drive conditions as stated above. In these drawings, denoted by 110 is a casing, 113 is a rotor shaft, 114 is a rotor, **115*a* and 115*b* are coils, 116*a* and 116*b* are stators, 117 is a disk having a number of slits formed therein, and 118 is a photo-interruptor for detecting the slit. The disk 117 and the photo-interruptor 118 jointly constitute an encoder for detecting a rotated angular position of the rotor 114 of the motor 110. A pulley is attached to the rotor shaft 113. The carriage 2** is moved via the timing belt stretched between that pulley and another pulley.

Figure 8:
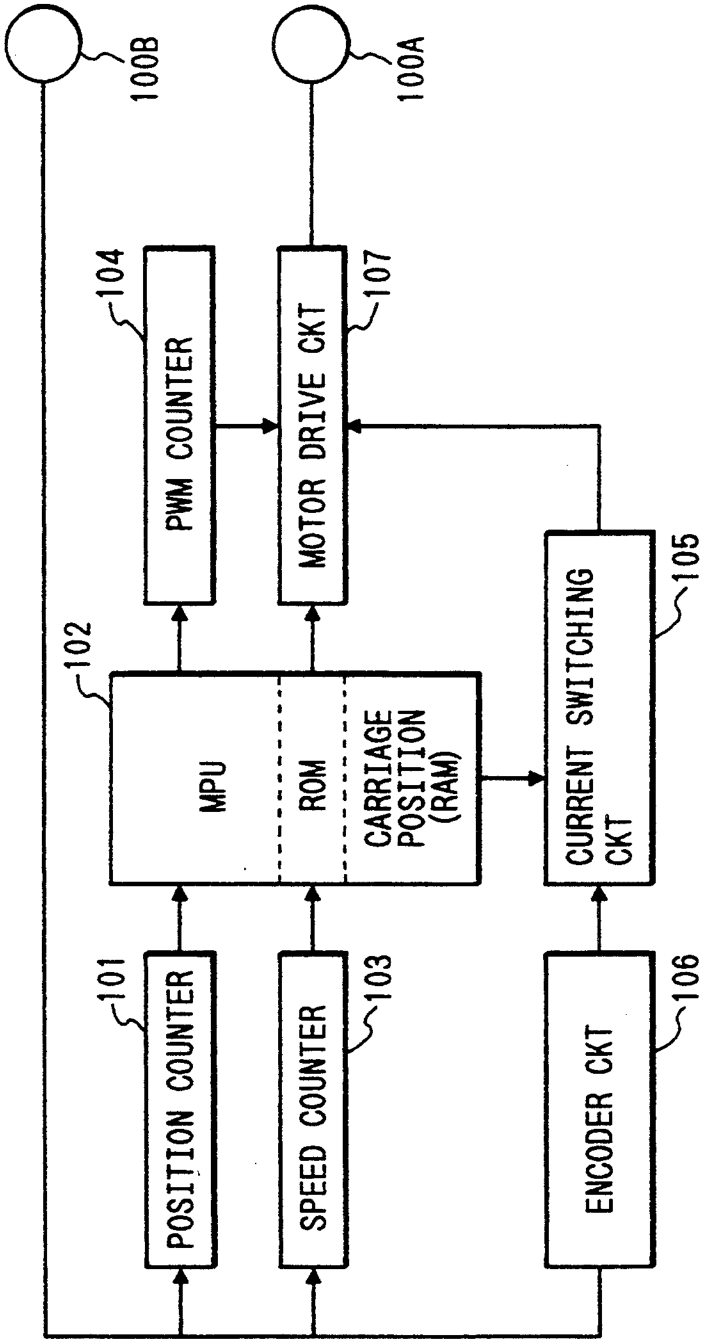
FIGS. 8 and 9 are a block diagram for driving the carriage motor according to one embodiment of the present invention, and a diagram for explaining a drive method of the carriage motor, respectively.

FIG. 8 is a block diagram showing a drive method of the carriage drive (stepping) motor 100 according to this embodiment. Because this embodiment uses the carriage drive motor 100 comprising an encoder section and a stepping motor section incorporated together, the motor is shown as being divided into the stepping motor section 100A and the encoder section 100B.

Denoted by 101 is a position counter for counting the number of signals produced from the encoder section 100B. In this embodiment, using a counted value of the position counter 101, an MPU 102 recognizes the current carriage position and other parameters to supervise the set position and control switching of motor drive modes, for example.

Numeral 103 is a speed counter which, also using the signals produced from the encoder section 100B, causes the MPU 102 to recognize a rotational speed of the stepping motor section 100A, i.e., a carriage speed. The speed counter 103 measures a pulse interval of the encoder signals. After predetermined processing using the counted value of the speed counter 103, the MPU 102 applies a required PWM value (which is a duty value for pulse width modulation, meaning that a larger output value increases the duty and flows a larger current) to a PWM counter 104, whereby the carriage motor 100 is driven under closed-loop control.

Numeral 105 is a current switching circuit for receiving the signals from the encoder section 100B through an encoder circuit 106 and controlling switching of the excitation phase of the stepping motor at a preset value.

Numeral 107 is a motor drive circuit for driving the stepping motor section 100A at the PWM value applied from the PWM counter 104 and at the current switching timing applied from the current switching circuit 105.

A method of driving the carriage motor 100 under the closed-loop control will now be explained.

Using the pulse signals produced from the encoder section 100B which rotates in synchronism with rotation of the stepping motor section 100A, the current switching circuit 105 automatically sets the switching timing for the phase of the stepping motor section 100A. On the other hand, the speed counter 103 detects a rotational speed of the stepping motor section 100A by receiving the pulse signals from the encoder section 100B and counting a pulse interval of those pulse signals. Through processing made inside the MPU 102 in accordance with the sequence preset in an internal ROM using the detected value, a required PWM value is calculated and set to the PWM counter 104. This PWM value is set in such a manner as to lower the rotational speed of the stepping motor section 100A, i.e., to reduce the duty of the PWM signal, for example, when the detected rotational speed is larger than an aimed (indicated) rotational speed.

In accordance with both the PWM value calculated by the MPU 102 and the phase switching timing applied from the current switching circuit 105, the stepping motor section 100A is driven via the motor drive circuit 107, following which the rotational speed of the stepping motor section 100A is detected again by the encoder section 100B. At this time, the excitation timing signal from the MPU 102 is not inputted to the motor drive circuit 107. Under the foregoing closed-loop control, the stepping motor section 100A is driven in a closed-loop manner.

A method of driving the carriage motor 100 in a mode of stepwise motor drive will be next explained.

In this mode, the excitation phase is switched not by the current switching circuit 105, but at the excitation timing (per time period) preset in the ROM in the MPU 102 as with normal stepwise motor drive. The current value in this mode is managed by the PWM value, Specifically, the PWM value preset in the MPU 102 is applied to the motor drive circuit 107 via the PWM counter 104. At this time, based on the counted value of the position counter 101, the MPU 102 inhibits application of the phase switching timing signal from the current switching circuit 105 to the motor drive circuit 107.

Thus, the stepping motor section 100A can drive the carriage motor at the preset phase switching timing and the preset current value (PWM value). During that mode, the encoder signals are continuously produced and used by the MPU 102 via the position counter 101 for determining the carriage position. While the carriage position is determined in the normal stepwise motor drive by counting the switching point of excitation phase preset in the MPU 102, this embodiment enables to determine the carriage position based on both a manner of counting the switching point of excitation phase like the prior art and a manner of counting the encoder signals.

The carriage motor 100 is driven in the mode of stepwise motor drive as mentioned above.

(Carriage Position and Motor Drive Mode)

Figure 9:
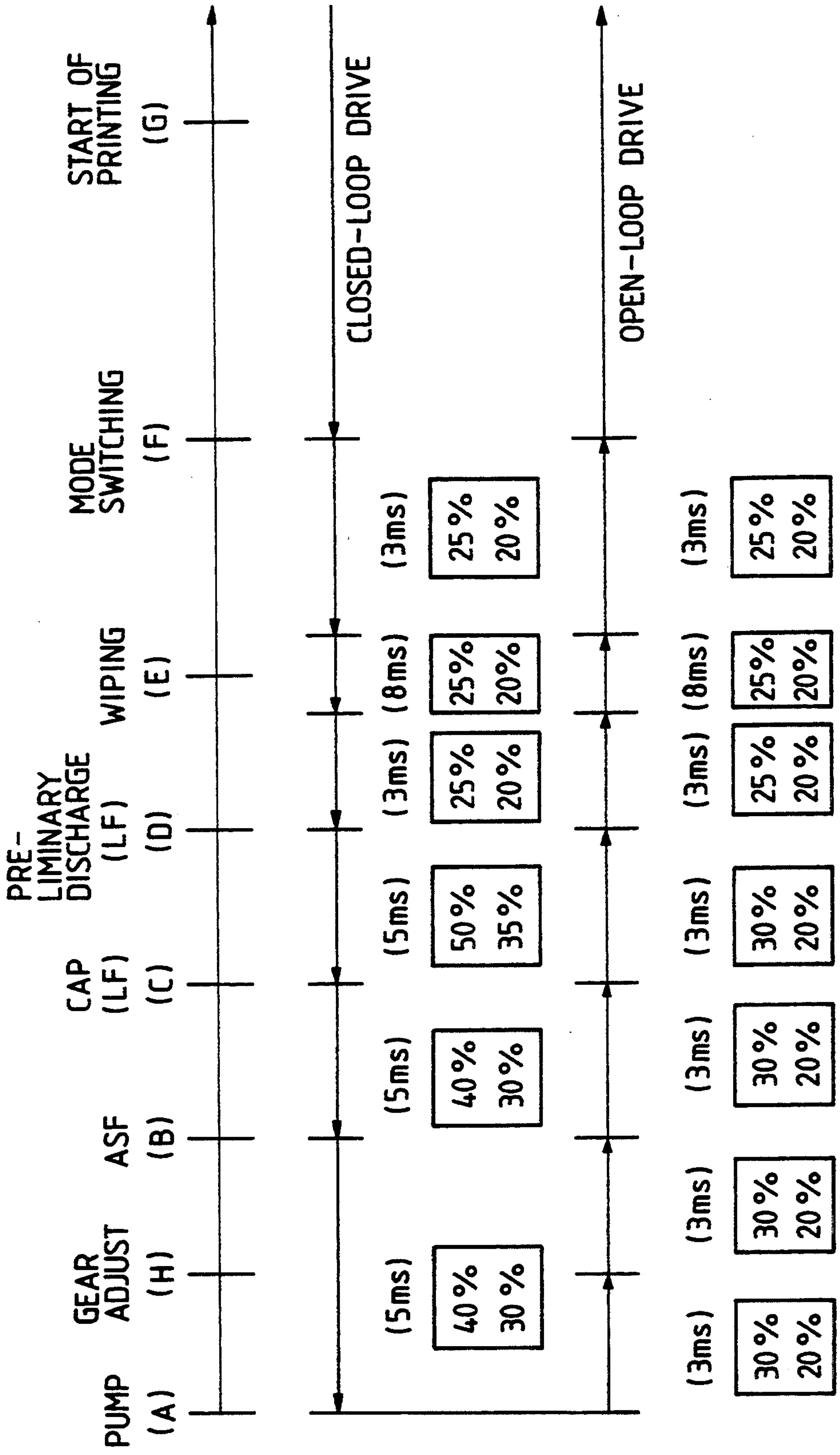

FIG. 9 is a diagram showing what is to be done at which position of the carriage 2 and how the carriage motor 100 is to be driven, while representing the end portion leftwardly of the recording area shown in FIG. 1.

The positions (A) to (D) have been explained in connection with the capping and the drive switching mechanism by referring to FIGS. 3 to 6. As mentioned before, (A) is the position where the drive force is transmitted to the pump 27, (B) is the position where the drive force is transmitted to the ASF 16, (C) is the position where the drive force is transmitted for feeding the sheet with the recording head kept capped, and (D) is the position where the drive force is transmitted for feeding the sheet and the recording head is faced the cap member for preliminary discharge.

Further, (E) is a position where the wiping operation is carried out by wiper 48, (F) is a position on the right side of which the closed-loop drive is effected for printing and on the left side of which the stepwise motor drive dependent on respective drive conditions is effected, and (G) is a position indicating a first dot of the printing area. (H) is a position where a gear adjustment is made to provide no deviation in the sheet feed position even when the slide gear 44 is once disengaged from the sheet feed output gear 34 for movement to the pump position and then returned to the position for meshing with the gear 34.

A time period put in ( ) indicates the excitation switching time of the motor phase explained before in connection with the stepwise motor drive. Further, a % number put in □ indicates the PWM duty value also stated above. The larger the number, the larger will be the amount of current applied. Then, the upper number indicates the PWM duty value during the 1-phase excitation in the 1-2-phase excitation drive and the lower number indicates the PWM duty value during the 2-phase excitation therein. Stated otherwise, in this embodiment, the 1-2-phase excitation drive is performed during the stepwise motor drive by setting different PWM duty values between during the 1-phase excitation and during the 2-phase excitation. In the case of the 1-2-phase excitation drive, since the produced torque becomes weaker during the 1-phase excitation than during the 2-phase excitation at the same amount of current, the PWM duty value is set to be larger during the 1-phase excitation. To produce the torque of almost the same magnitude, in this embodiment, the PWM duty value during the 2-phase excitation is set about $1/\sqrt{2}$ time as many as that during the 1-phase excitation. Thus, the stepwise motor drive in this embodiment is carried out by changing the PWM duty value per switching of the motor phase.

The carriage speed, i.e., the excitation switching time of the motor phase, is changed over at each of the positions. In the wiping operation, for example, the wiper is driven at the switching timing (8 ms in this embodiment) to produce a predetermined speed lower than usual, thereby ensuring the positive wiping. Further, to shorten the overall operation time, the switching timing is set to 8 ms in the necessary minimum portion and 3 ms in both the portions forwardly and rearwardly of the central minimum portion for increasing the drive speed.

In the range of positions (A) to (D) of the drive switching mechanism, the leftward movement is counter to a resilient force of the spring 26 and requires larger drive torque. Therefore, the switching timing is set to 5 ms to drive the carriage at a lower speed. Conversely, since the rightward movement corresponds to the direction in which the spring 26 restores, the switching timing is set to 3 ms to drive the carriage at a higher speed.

In the movement of (D) to (C), the cap member 23 rides over the cam portion of the rail 25 and large drive torque is required. Accordingly, the PWM duty value is set to a large value as given by 50% and 35%.

Note that the values necessary for the control can be stored in the form of a table in the ROM of the MPU.

(Control Sequence)

Control of the sheet feed motor and the carriage motor at the drive switching portions (A) to (D) will be described with reference to FIGS. 10 and 11.

In this embodiment, the carriage movement between adjacent positions (A), (H), (B), (C) and (D) is controlled by each subroutine. For example, the carriage movement of (A) to (D) is controlled by respective subroutines for (A) to (H), (H) to (B), (B) to (C) and (C) to (D). Since basic flows of the subroutines are analogous to each other, one of them will be described as an example below.

Figure 10:
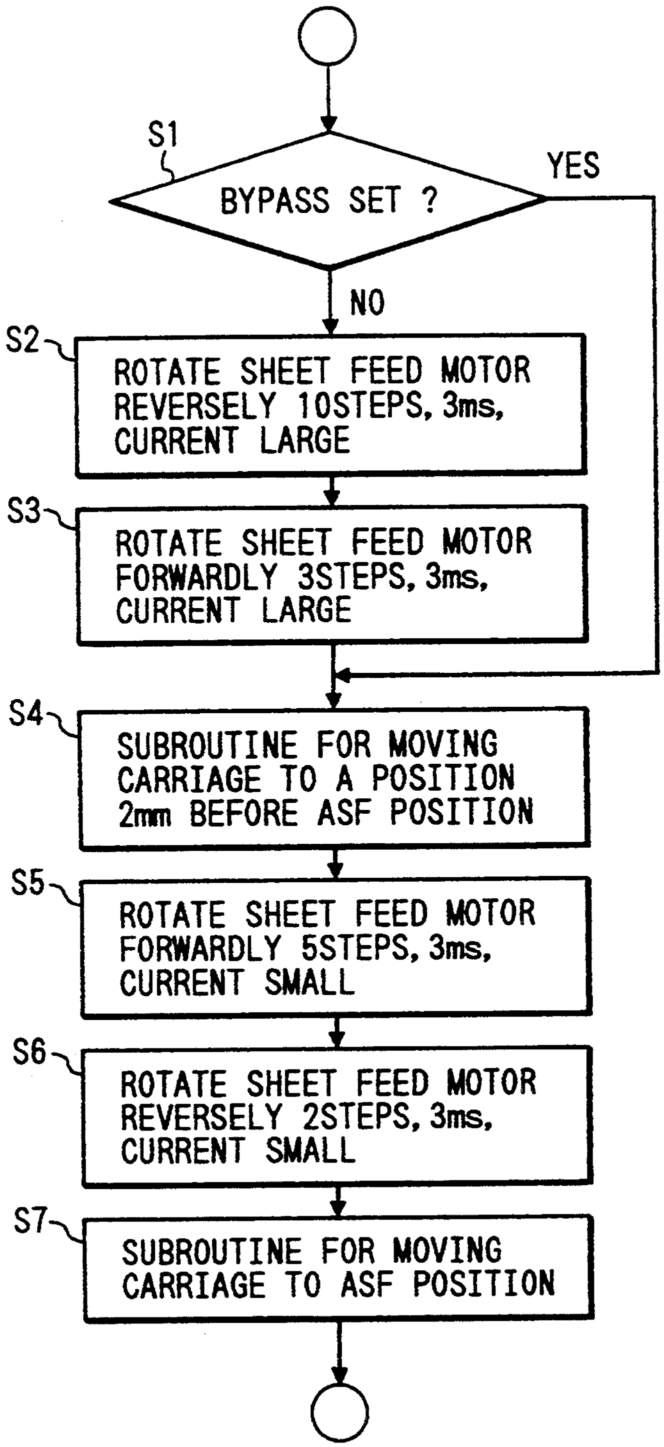
FIGS. 10 and 11 are flowcharts showing one exemplified sequence in a gear switching section for driving a sheet feed motor and the carriage motor.

The sequence shown in FIG. 10 represents one of the subroutines which is used to move the carriage from the cap position (C) to the ASF position (B).

First, there will be explained a decision at Step S1. When the carriage has been moved from the preliminary discharge position (D) to the cap position (C) immediately before this subroutine is called, for example, the carriage movement has been ended with releasing pressure contact of the slide gear at final steps of the subroutine for the movement from (D) to (C) and, therefore, an overlap occurs in releasing pressure contact of the slide gear made by Steps S2 and S3 in this sequence. Accordingly, the Steps S2, S3 are skipped (bypassed) for the purpose such as shortening the operation time. The decision whether the bypassing is set or not may be made by referring to a flag (e.g., provided in the RAM of the MPU) which is set during the continuous carriage movement.

Steps S2 and S3 are to release pressure contact between the slide gear 44 and the sheet feed output gear 34, thereby making the slide gear 44 and hence the carriage movable. More specifically, in Step S2, the slide gear 44 is rotated reversely to be sufficiently pressure contacted with the sheet feed output gear 34 by absorbing the backlash, etc. between the two gears. Under this condition, Step S3 rotates the slide gear 44 in a direction opposite to that in Step S2, i.e., in the forward direction, for a predetermined number of pulses (3 pulses in this embodiment), so that the pressure contact between the slide gear and the sheet feed output gear is completely eliminated or free. Here, the current value for the sheet feed motor 20 is set to any of three stages, i.e., large, medium and small, in a switchable manner. Because of requiring large torque under a condition that the slide gear 44 is meshed with the sheet feed output gear 34, the current value is set to be large. Additionally, the phase switching timing is set to 3 ms in this embodiment.

Figure 11:
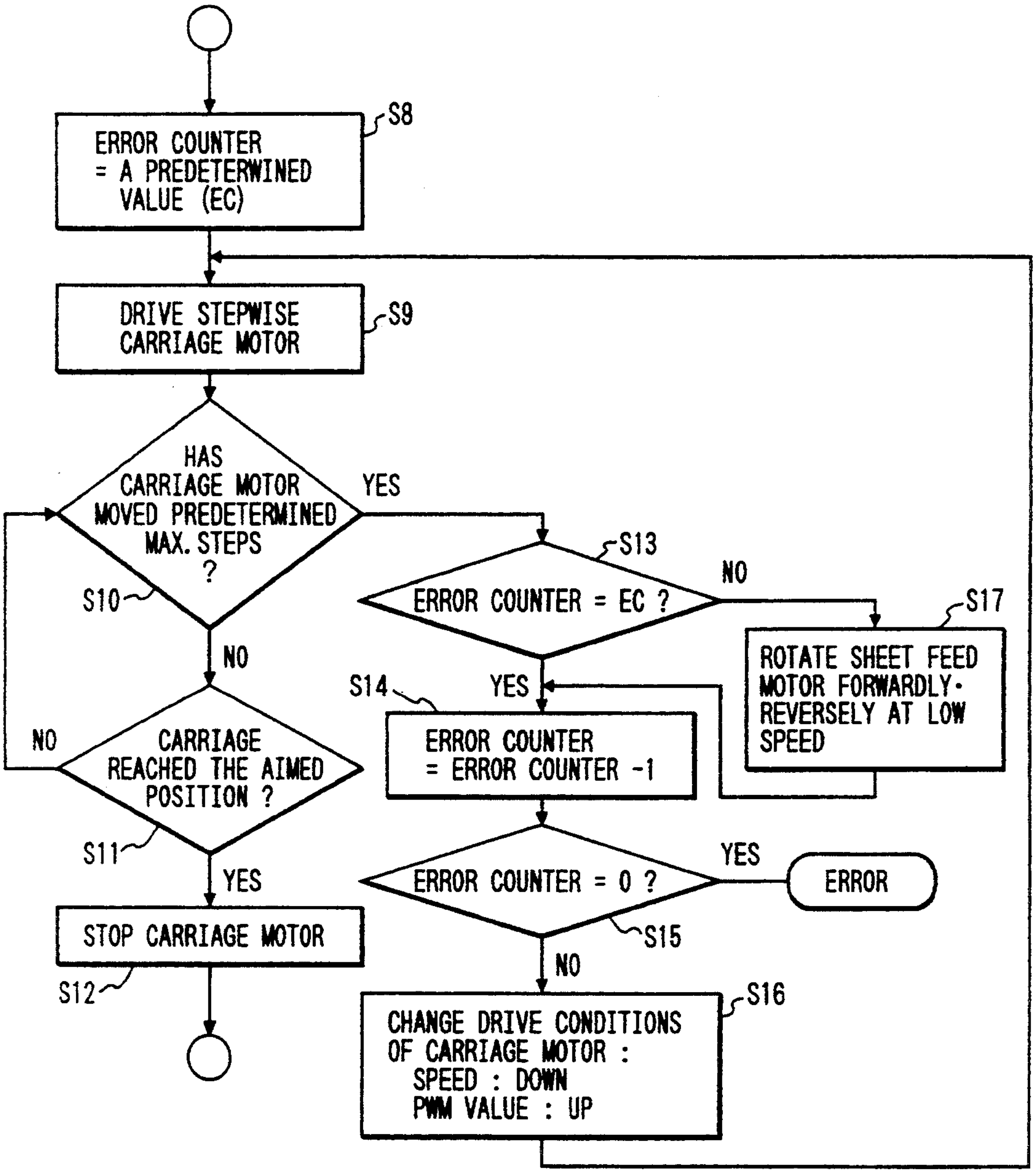

Step S4 is a subroutine, shown in FIG. 11, for moving the carriage to an aimed position. Here, the carriage is moved to a position about 2 mm before the ASF position B.

This subroutine will now be explained by referring to FIG. 11. An error counter set in Step S8 is used to control a recovery operation when the carriage has failed to reach the aimed position by the normal operation. In this embodiment, as described later, the first recovery sequence is set to only increase the drive force of the carriage, and the second and subsequent recovery sequences are set to drive the sheet feed motor 20 in addition. Unless the carriage reaches the aimed position even after a predetermined number (EC times) of recovery sequences, the control result indicates an error. To this end, Step S8 sets in the error counter.

By using that recovery sequence, stepwise drive conditions of the carriage motor set in Step S9 can be set to a drive force with some extent of margin, making it possible to avoid a surplus drive force and reduce noises attendant on driving.

In Step S9, the stepwise motor drive for the movement from (C) to (B) is performed at the switching timing of 5 ms with the 1-2-phase excitation (the PWM duty of 40% for 1-phase drive and the PWM duty of 30% for 2-phase drive) in this embodiment, as shown in FIG. 9. Step S9 also sets maximum steps given by the number resulted from adding the number of steps for the carriage mot;or, which is calculated based on the movement distance corresponding to a difference between the current carriage position counted by the MPU 102 using the position counter 101 shown in FIG. 8 and the aimed position, to a predetermined number of steps for allowance.

Step S11 is to determine whether or not the carriage has reached the aimed position from the position counter 101 counting the aforesaid encoder signals. Upon reaching the aimed position, the carriage motor is stopped in Step S12.

On the other hand, if Step S10 determines that the carriage does not reach the aimed position after beyond the maximum steps set by Step S9, then the control flow enters the recovery sequence. Step S13 is provided so as not to drive the sheet feed motor in Step S17 for the 1st stage recovery sequence. In Steps S14 and S15, control is made to indicate an error if the carriage does not reach the aimed position after the recovery sequence has been repeated the predetermined number (EC) of times. Taking into account that the carriage could not reach the aimed position for some reason under the drive conditions set in Step S9, Step S16 sets the drive conditions to increase the drive force. For example, while the drive conditions of (5 ms, 40%, 30%) are set in Step S9, Step S16 sets the drive conditions of (5 ms, 60%, 40%) or the like to increase the drive force.

Step S17 is provided in anticipation of the ease that the slide gear 44 cannot disengage from or mesh with the mating gear for some reason. In Step S17, the sheet feed motor 20 is rotated at a low speed to cope with that problem.

Referring to FIG. 10 again, the reason that the aimed position is set in Step S4 is not the ASF position, but a position slightly before the ASF position. At the time of moving the carriage in Step S4, the slide gear 44 is not usually brought into mesh with the ASF output gear 33 and the leaf spring 23D serves as a damper (see to FIGS. 3 to 6 in detail). If the amount of resulting overlap between the gears is too large, the drive force of the carriage would be excessively great, or a large flexture of the spring would be required, thus causing a problem of durability. For this reason, the slide gear 44 is meshed with the ASF output gear 33 at the time the overlap amount between the gears is small.

Next, in Step S5, the sheet feed motor 20 is rotated forwardly through 5 steps, during which the slide gear 44 is now meshed with the ASF output gear 33. Then, in Step S6, the pressure contact between the slide gear 44 and the ASF output gear 33 is released, causing the slide gear 44 to move to a predetermined position. In other words, the slide gear 44 and the ASF output gear 33 are brought into a meshed condition at a position 2 mm before the final meshing position.

Thereafter, under the condition that the pressure contact between the slide gear 44 and the ASF output gear 33 is released, Step S7 moves the slide gear 44 through the remaining distance of about 2 mm up to the ASF position, so that the slide gear 44 is moved into the final meshing position with the ASF output gear 33.

As stated before, through a combination of the carriage moving subroutines between every adjacent two positions such as exemplarily described above, the carriage movement to any desired location is achieved.

(Practical Example of Skip)

Figure 12:
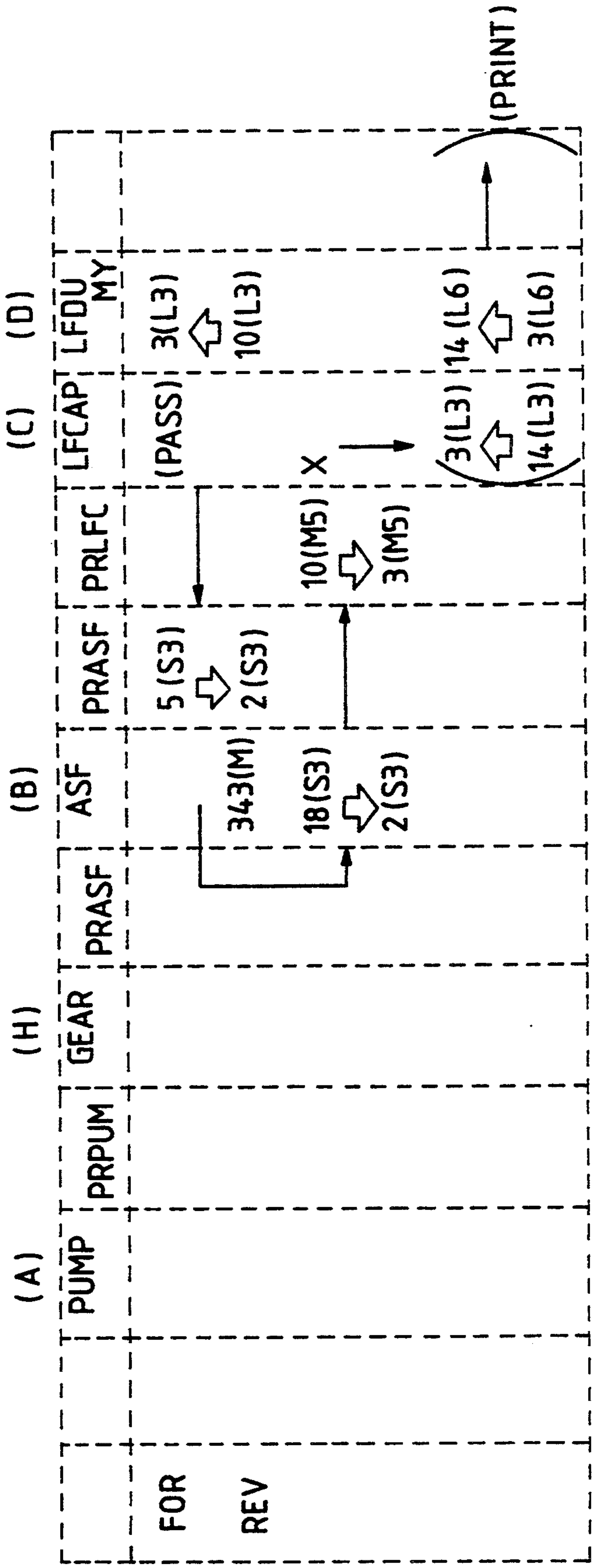
FIGS. 12 and 13 are diagrams for explaining how to load record sheets through sheet feeding by the ASF based on bypass judgment.
Figure 13:
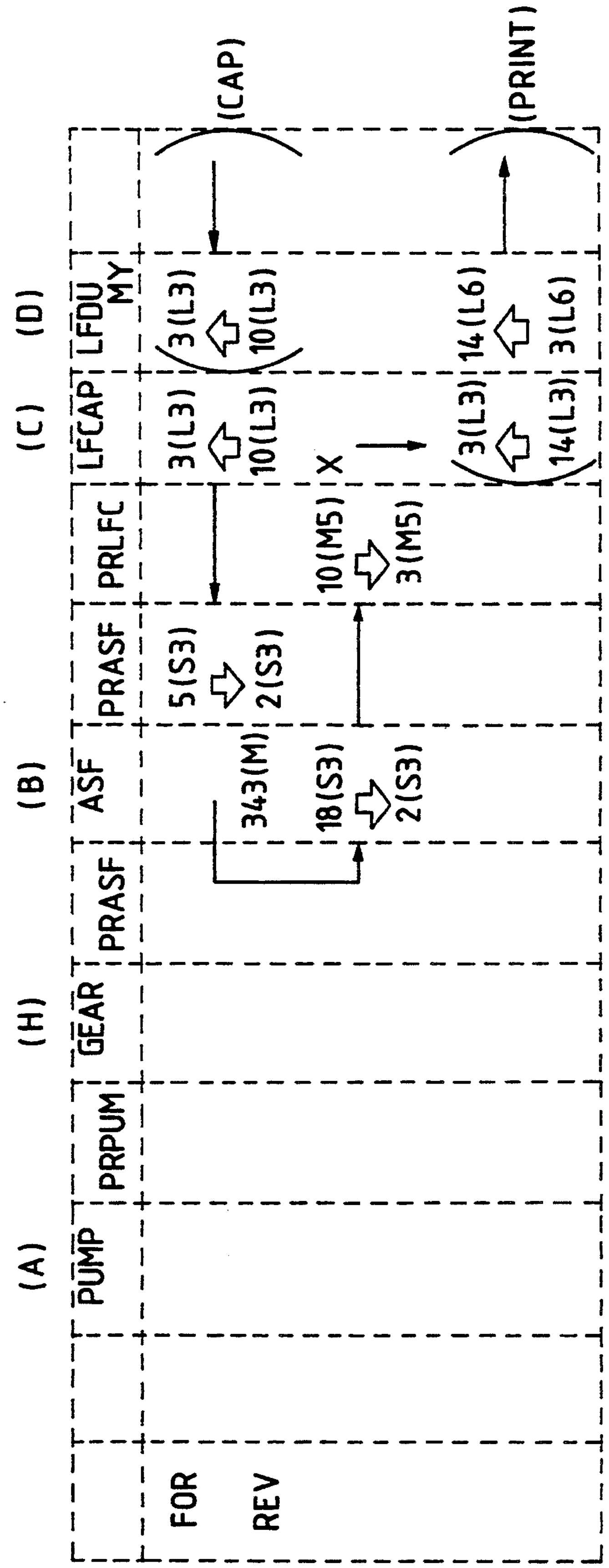

How the skip decision shown in Step S1 of FIG. 10 is employed practically will be explained with reference to FIGS. 12 and 13. FIG. 12 is a diagram showing the status of operation of the motor as a drive power source and movement of the carriage when the record sheet is loaded from an uncapped condition. FIG. 13 is a diagram showing the status of operation of the motor as a drive power source and movement of the carriage when the record sheet is loaded by the ASF from a capped condition.

(A) to (D) and (H) represent the aforesaid carriage stop positions for the switching operation. The position indicated by "PROOO" represents a position about 2 mm to the left or right before each operating position shown in Step S4 of FIG. 10 (e.g., "PRASF" represents a position before "ASF"). Accordingly, (A)PUMP to (D)LFDUMY correspond to respective positions at which the carriage is to be stopped from the left side in the direction of movement of the carriage. Smaller arrows in the drawings show a sequence of the carriage movement or control flow, whereas larger arrows show the order of forward and reversed operations of the record sheet feed motor. The column above each larger arrow indicates the number of steps in the forward rotating direction of the record sheet feed motor and, in ( ), L (large current), M (medium current) or S (small current) and the excitation phase switching time are listed. The column below each larger arrow indicates similar three items for the reversely rotating direction. For example, the first operation in FIG. 12 is represented by those items at the upper right corner, meaning that the record sheet feed motor is rotated reversely with the excitation phase switching time of 3 ms and large current through 10 steps and, thereafter, rotated forwardly with the excitation phase switching time of 3 ms and large current through 3 steps.

The diagram of FIG. 13 including no skip operation will be first explained.

The operation starts from a condition that the carriage is stopped at the cap position (C) with the recording head capped. Under this condition, there is a possibility that the record sheet feeding operation, etc. has been carried out before, and hence that the slide gear 44 is in pressure contact with the record sheet output gear 34. It is therefore required to release the gear contact pressure by rotating the record sheet feed motor reversely through 10 steps and then forwardly through 3 steps as shown in Steps S2 and S3 of FIG. 10. Afterward, the carriage 2 is moved to a PRASF position 2 mm before the ASF operating position (B), where the motor is rotated forwardly through 5 steps for meshing the slide gear 44 with the ASF output gear 33 and then reversely through 2 steps for releasing the gear pressure contact. Subsequently, after moving the carriage up to the ASF operating position (B), the ASF sheet feed roller is rotated through 343 steps for feeding the record sheet 5. Then, after rotating the motor forwardly through 18 steps and reversely through 2 steps to release the pressure contact between the slide gear 44 and the ASF output gear 33, the carriage 2 is moved to a position about 2 mm before the cap position. Next, the motor is rotated forwardly through 10 steps for meshing the slide gear 44 with the record sheet feed gear 34. After rotating the motor reversely through 3 steps to release the slide from its pressure contact condition, the carriage is further moved up to the cap position (C). Under this condition that the slide gear 44 is coupled with the record sheet feed gear 34, the motor 20 is rotated forwardly to load the record sheet. The number x of steps at this time is set to rotate the motor through a predetermined number of steps from the position at which the sheet leading edge has been detected.

The operation shown in FIG. 12 will be next explained.

Under a condition that the carriage is at the preliminary discharge position (D), the motor is rotated reversely through 10 steps and forwardly through 3 steps to release the slide gear 44 from its pressure contact condition, making the slide gear 44 and the carriage 2 movable. Then, the carriage 2 is moved up to the cap position (C). Thereafter, while the drive motor is rotated reversely and then forwardly in FIG. 13, this operation is omitted in FIG. 12. The reason is that at both of the preliminary discharge position (D) and the cap position (C), the slide gear 44 is meshed with the sheet feed output gear 34 while keeping the slide gear released from its pressure release condition after the preliminary discharge position (D) and, therefore, the operation for releasing the slide gear again at the cap position (C) is not required. The operations after that are the same as those shown in FIG. 13.

(Operation at Power-on)

Figure 14:
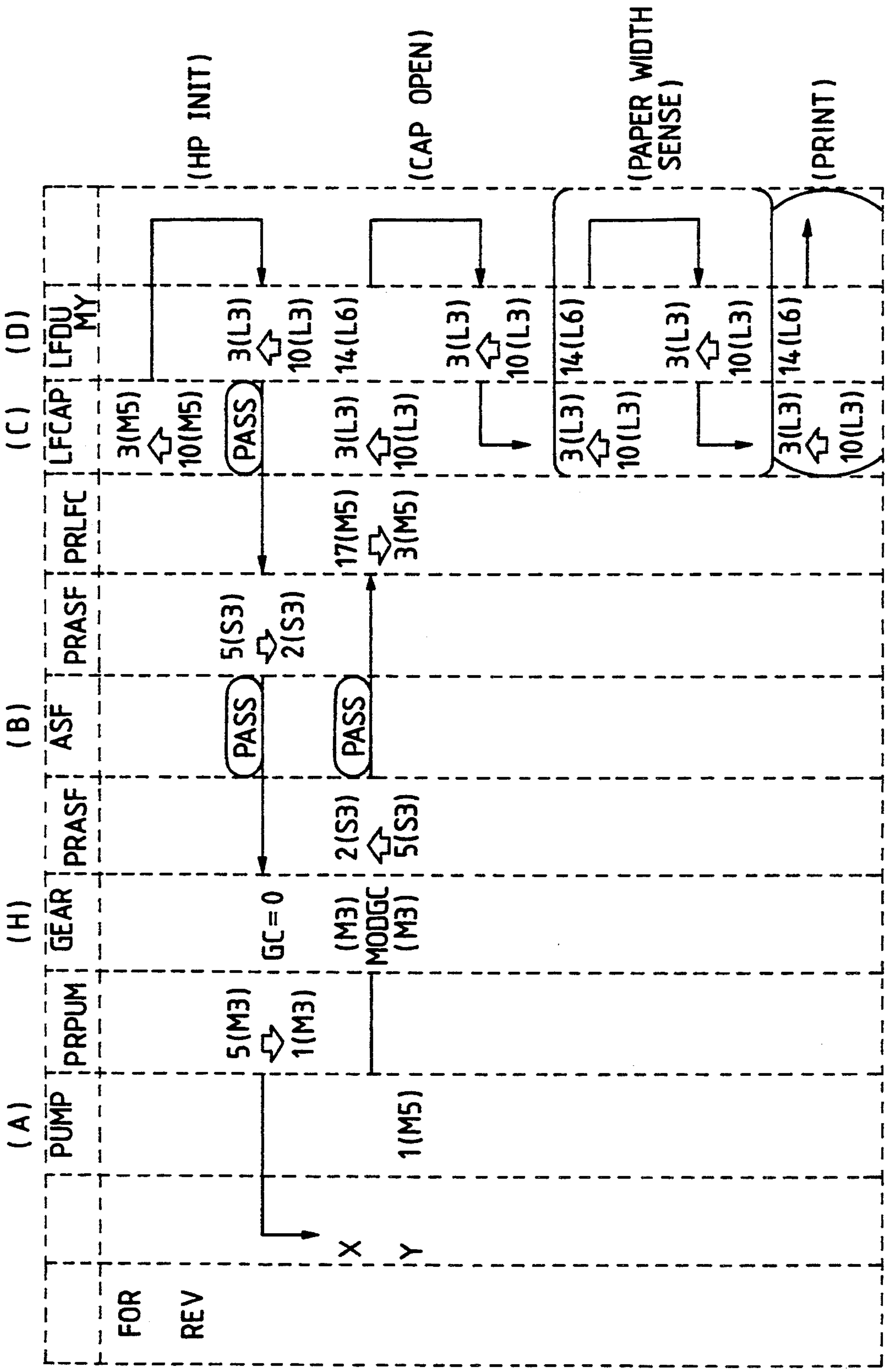
FIG. 14 is a diagram for explaining an initial operation when a power source is turned on under a condition of continuous paper being set.

FIG. 14 shows operations to be made when the power source is turned on with continuous paper inserted.

Under a condition that the carriage is at the cap position (C) and the recording head is capped, the sheet feed motor 20 is rotated reversely through 10 steps and forwardly through 3 steps to release the pressure contact condition, following which the carriage 2 is moved rightward to detect the home position for performing the initializing operation of the carriage motor 100. Then, after rotating the sheet feed motor 20 reversely through 10 steps and forwardly through 3 steps to release the pressure contact condition when the carriage is at the preliminary discharge position (D), the carriage is moved up to the cap position (C). At the cap position (C), as explained in connection with FIG. 12, the sheet feed motor 20 is not driven and the carriage 2 is moved to the position slightly before the ASF position.

At that position, the sheet feed motor is rotated forwardly through 5 steps for meshing the slide gear 44 with the ASF output gear 34, and then reversely through 2 steps to release the gear pressure contact condition. Next, the carriage is moved up to the ASF position (B). Since the slide gear 44 and the ASF output gear 33 are now released from the pressure contact condition, the operation of releasing the gear pressure contact is not required here. Therefore, the carriage 2 is at once moved to a position slightly before the position (A) for the restoring operation via the gear adjusting position (H). During this movement, a gear counter (which can be given by using a predetermined area of the RAM) for counting the number of steps of the sheet feed motor 20 rotated subsequently is reset to "0". Under the condition that the carriage is at the position slightly before the restoring position (A), the sheet feed gear 20 is rotated forwardly through 5 steps to provide positive meshing of the gears. At this time, the gear counter is counted up corresponding to the movement through 5 steps and shows "5". Then, the motor is rotated reversely through 1 step to release the gear contact pressure condition and, simultaneously, the gear counter is counted down by 1 to become "4".

After moving the carriage 2 up to the restoring position (A), the sheet feed gear 20 is rotated forwardly and reversely to carry out the restoring operation. During this operation, the gear counter is counted up by 1 each time the sheet feed gear 20 is rotated forwardly through 1 step, and counted down by 1 each time it is rotated reversely through 1 step. After the end of the restoring operation, the sheet feed gear 20 is further rotated reversely through 1 step to release the gear pressure contact condition. Here, the gear counter is also counted down by 1. Subsequently, the carriage is moved to the gear adjusting position (H) which is located between the restoring position (A) and the ASF position (B) and at which the slide gear 44 is meshed with neither the pump output gear 32 nor the ASF output gear 33. At the gear adjusting position (H), the motor is rotated through the number of steps corresponding to the residual resulted from dividing the value of the gear counter by the number of steps (e.g., 6 steps) provided by one tooth of the slide gear, in a direction opposite to the sign of the residual. When the value of the gear counter is "+26", by way of example, the motor is rotated reversely through 2 steps because of $26 \div 6 = 4$ and the residual 2. In the case of another example that the value of the gear counter is "−26", the motor is rotated forwardly through 2 steps because of $26 \div 6 = 4$ and the residual 2. With such processing, the tooth phase of the slide gear can be matched at the gear adjusting position (H) between when it goes to the restoring operation and when it returns therefrom.

After moving the carriage 2 to a position slightly before the ASF position, the sheet feed gear 20 is rotated reversely through 5 steps to mesh the slide gear with the ASF output gear, and then rotated forwardly through 2 steps to release the gear pressure contact condition, Thereafter, the carriage 2 is moved to the ASF position, followed by moving it to a position slightly before the cap position. By now rotating the sheet feed gear 20 forwardly through 17 steps, the slide gear 44 is meshed with the sheet feed output gear 34.

As mentioned above, the tooth phase of the slide gear 44 is made matched at the gear adjusting position (H) between when the carriage 2 moves to the left and when it moves to the right. Further, when the carriage 2 is moved to the left, the motor is rotated forwardly through 5 steps and then reversely through 2 steps, i.e., rotated forwardly through 3 steps as a consequence, until the slide gear 44 is departed from the sheet feed output gear 34 and moves to the gear adjusting position (H). On the other hand, when the carriage 2 is moved to the right, the motor is rotated reversely through 5 steps and then forwardly through 2 steps, i.e., rotated reversely through 3 steps as a consequence, until the slide gear 4,1 moves from the gear adjusting position (H) to the position slightly before the sheet feed output gear 34. By matching the tooth phase of the slide gear 44 at the gear adjusting position (H), therefore, the tooth phase given when the slide gear 44 disengages from the sheet feed output gear 34 while the carriage is moving to the left can be automatically matched with the tooth phase given when the slide gear 44 engages the sheet feed output gear 34 while the carriage is moving to the right. As a result, when the carriage 2 is moved to the position slightly before the cap position during its movement to the right, the slide gear 44 can smoothly mesh with the sheet feed output gear 34 without striking against the sheet feed output gear 34. The drive force for rotating the motor forwardly through 17 steps to effect the positive gear meshing is all utilized to rotate the sheet feed output gear 34, whereby the sheet feed output gear 34 is rotated through 17 steps.

The rotations of the sheet feed output gear 34 made from the start-up to the printing (PRINT), including the forward and reverse rotations of the sheet feed motor 20 necessary in a subsequent operation of sensing the paper width (PW SENSE), etc., are picked up as follows; (reversely 10, forwardly 3), (reversely 10, forwardly 3), (forwardly 17, reversely 3), (reversely 10, forwardly 3), (forwardly 14), (reversely 10, forwardly 3), (reversely 10, forwardly 3), (forwardly 14), and (reversely 10, forwardly 3). This results in rotation of "0" step in the forward and reverse directions.

Consequently, the continuous paper once set at a predetermined position will not be changed in its recording position between the start and the end of the initial operation.

If the gear adjusting operation is not performed in the above process, for example, there may occur that the slide gear 44 and the sheet feed output gear 34 are not meshed with each other (i.e., their teeth strike against each other) at the time of the aforesaid forward rotation through 17 steps. In such a case, the sheet feed output gear 34 cannot be driven to rotate in the first several steps of the total 17 steps. Therefore, the rotation of the sheet feed output gear 34 in the forward rotation becomes so insufficient that the record sheet is stopped at a position lowered rearwardly. For that reason, the foregoing processing is very effective.

(Restoring Operation)

Figure 15:
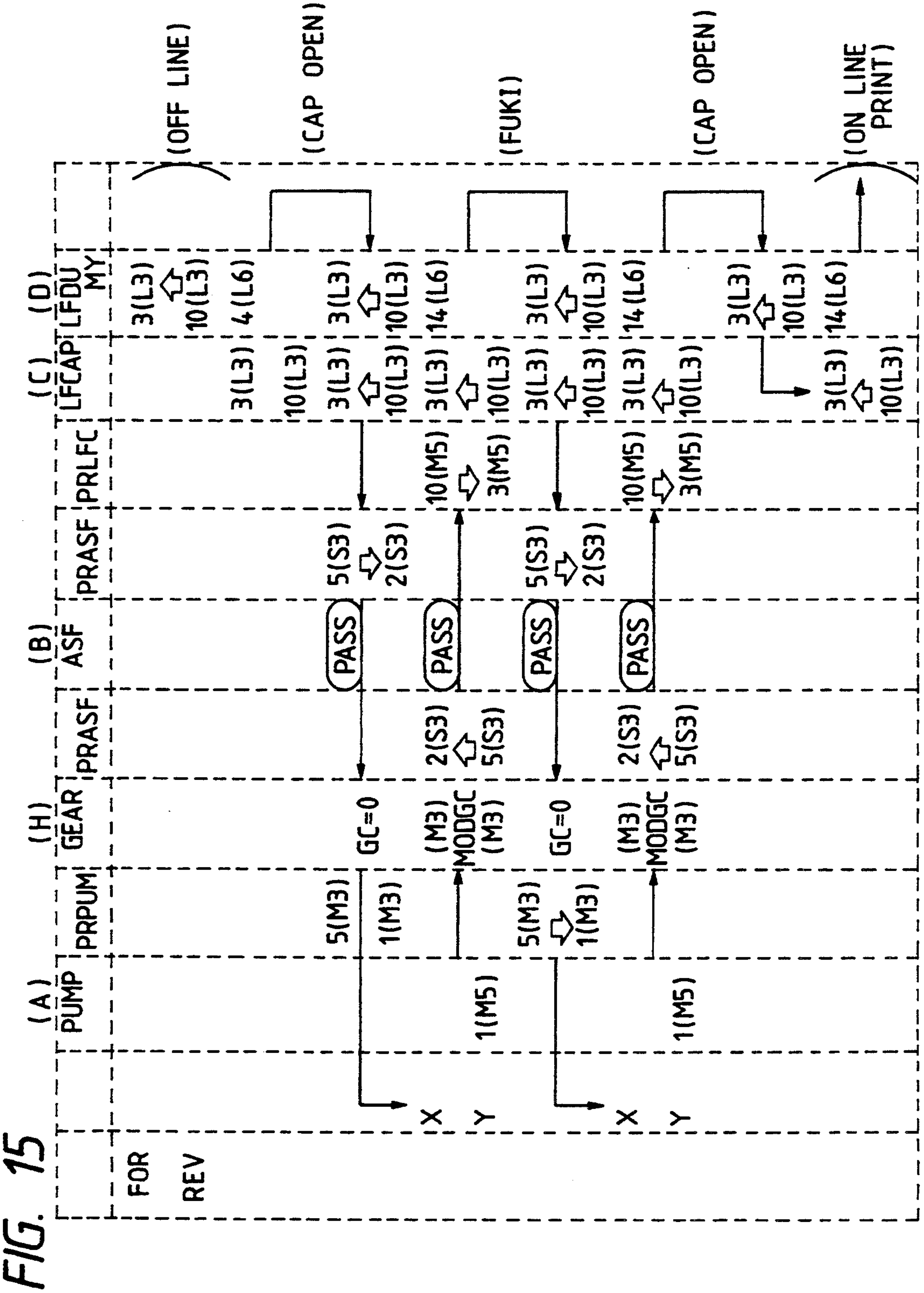
FIG. 15 is a diagram for explaining a restoring operation.

FIG. 15 shows a sequence of the restoring operation. Although the restoring operation is performed in a like manner as stated above by referring to FIG. 14, the reason that the carriage is once moved to the left and then returned to the right again after reaching the restoring position is because of carrying out the wiping operation (FUKI) to wipe the discharge ports of the recording head at a position rightwardly of the preliminary discharge position (D). Thereafter, the carriage is returned to the restoring position (A) to perform the rest of the restoring operation.

In a series of the above operations, as with the initial operation, the slide gear 44 is also smoothly meshed with the sheet feed output gear 34 when the carriage 2 is moved to the position slightly before the cap position through the rightward movement, so that the drive force of the sheet feed motor 20 produced at that position is all utilized to rotate the sheet feed output gear 34.

As a result, all of the sheet feeding operations made on the right side of the pre-cap position (PRLFC) shown in FIG. 15 are completely utilized to feed the sheet, whereby the final feed amount becomes "0" as a result of offset in feed amounts between the forward and reverse directions. Note that before and after this processing, there respectively occur an off-line operation (OFF LINE) and an online operation (ON LINE) with respect to an image data supply source.

(Initializing Operation)

Next, the initial operation for the recording apparatus according to this embodiment will be described with reference to FIGS. 16 to 19. The same steps as those in the above-stated switching operation will be omitted here.

Figure 16:
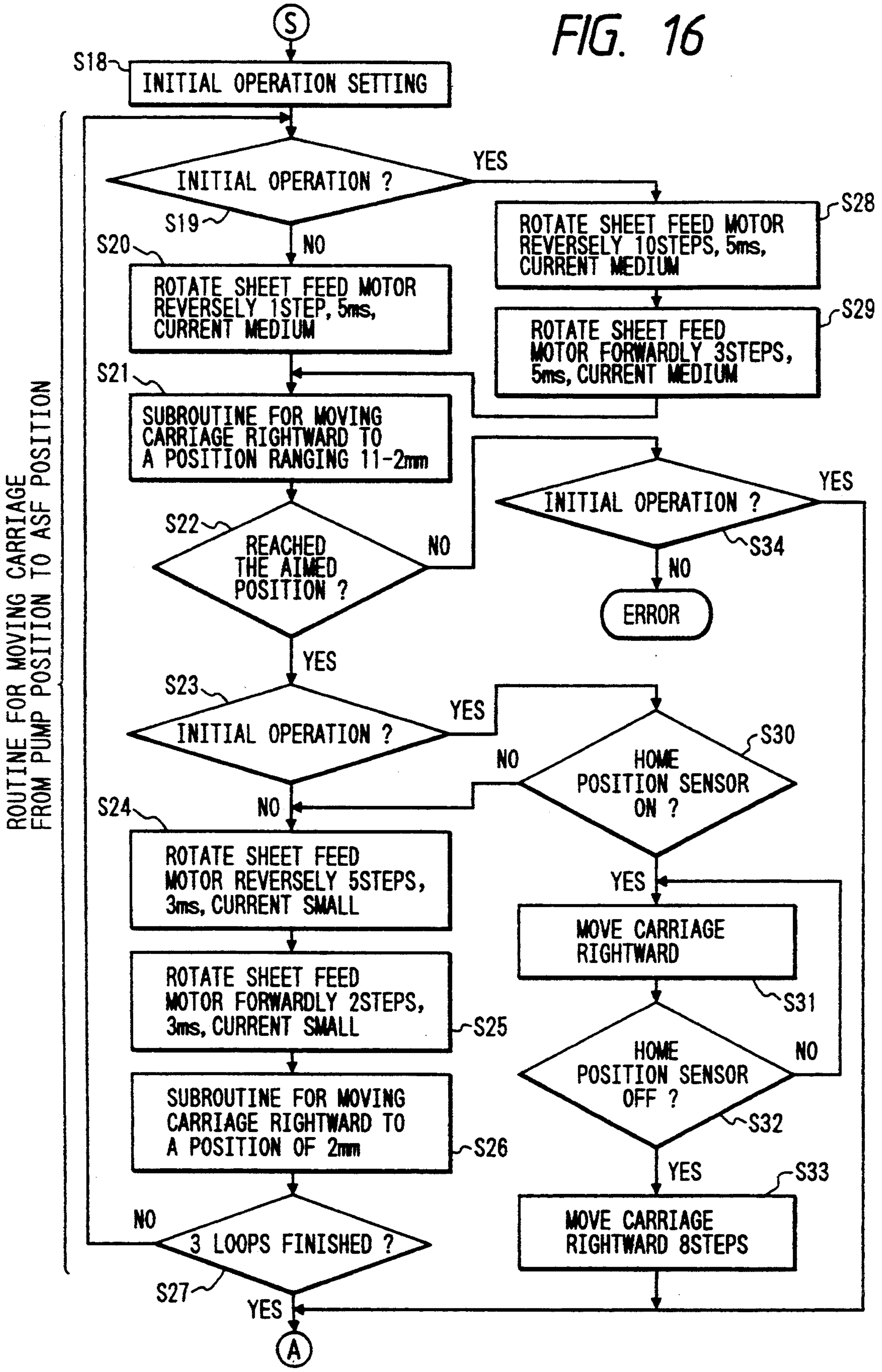
FIGS. 16 and 17 are flowcharts showing one exemplified sequence of the initial operation.
Figure 17:
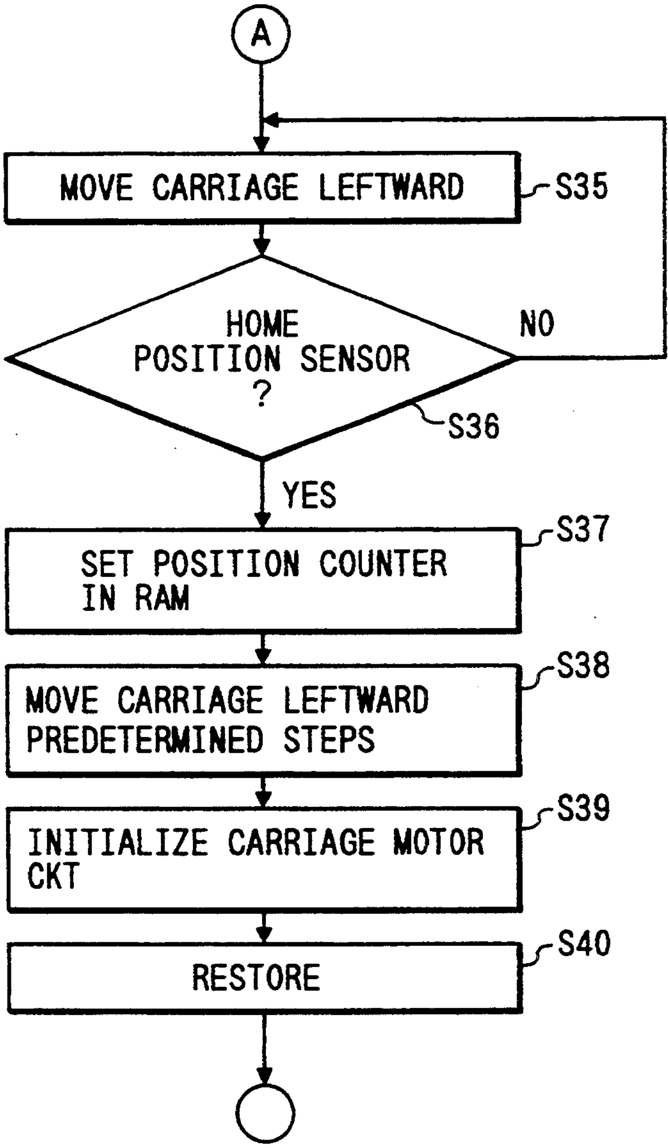

FIGS. 16 and 17 show one exemplified sequence of the initial operation. First, in Step S18, this operation is set as the initial operation. The reason is that because a subroutine of Steps S19 to S26 is shared with the subroutine for moving the carriage from the pump position to the ASF position, Step S18 is used to determined whether or not it is the initial operation in the routine.

If the initial operation is not determined in the decision of Step S19, i.e., when the carriage is moved from the pump position to the ASF position, the sheet feed motor 20 is only rotated reversely through 1 step to release the gear contact pressure prior to the subsequent processing. Meanwhile, in the case of the initial operation, the motor is rotated reversely through 10 steps and then forwardly through 3 steps to release the gear contact pressure in Steps S28 and S29. This releasing operation enables to release the gear contact pressure condition no matter which position of the pump position, the ASF position, the cap position, etc. the carriage takes.

Next, the carriage is moved 9 mm to the right in Step S21. The resulting position is indicated by (1) on the right side of each initial carriage position (• mark) for "Case 1" to "Case 5" in FIG. 19. As shown in "Case 3" where the carriage 2 is at the pump position, for example, the resulting position is given by one 2 mm before the ASF position. Note that the aforesaid recovery sequence as shown in FIG. 11 is also performed in this subroutine.

Then, it is determined in Step S22 whether or not the aimed position has been reached. If the aimed position cannot be reached even after the recovery sequence, then this is judged in this initial processing that the carriage 2 is at a position similar to "Case 5", i.e., that the carriage 2 is located near the right end and can no longer advance rightward, followed by proceeding to Step S35 via S34. On the other hand, if the carriage 2 can reach the aimed position, then it is determined in the initial operation whether or not the sensor for sensing the carriage being at the home position is turned on (Step S30). If the home position sensor is turned off, then this is judged that the carriage 2 belongs to "Case 2", "Case 3" or "Case 4". Thus, after effecting the gear meshing and releasing the gear pressure contact in Steps S24 and S25, the carriage is further moved 2 mm in Step S26. The resulting position is indicated by (2) in "Case 2" to "Case 4". If a decision sequence of Step S27 determines that a series of operations (loops) have not yet repeated three times, the control flow returns to Step S19.

Figure 19:
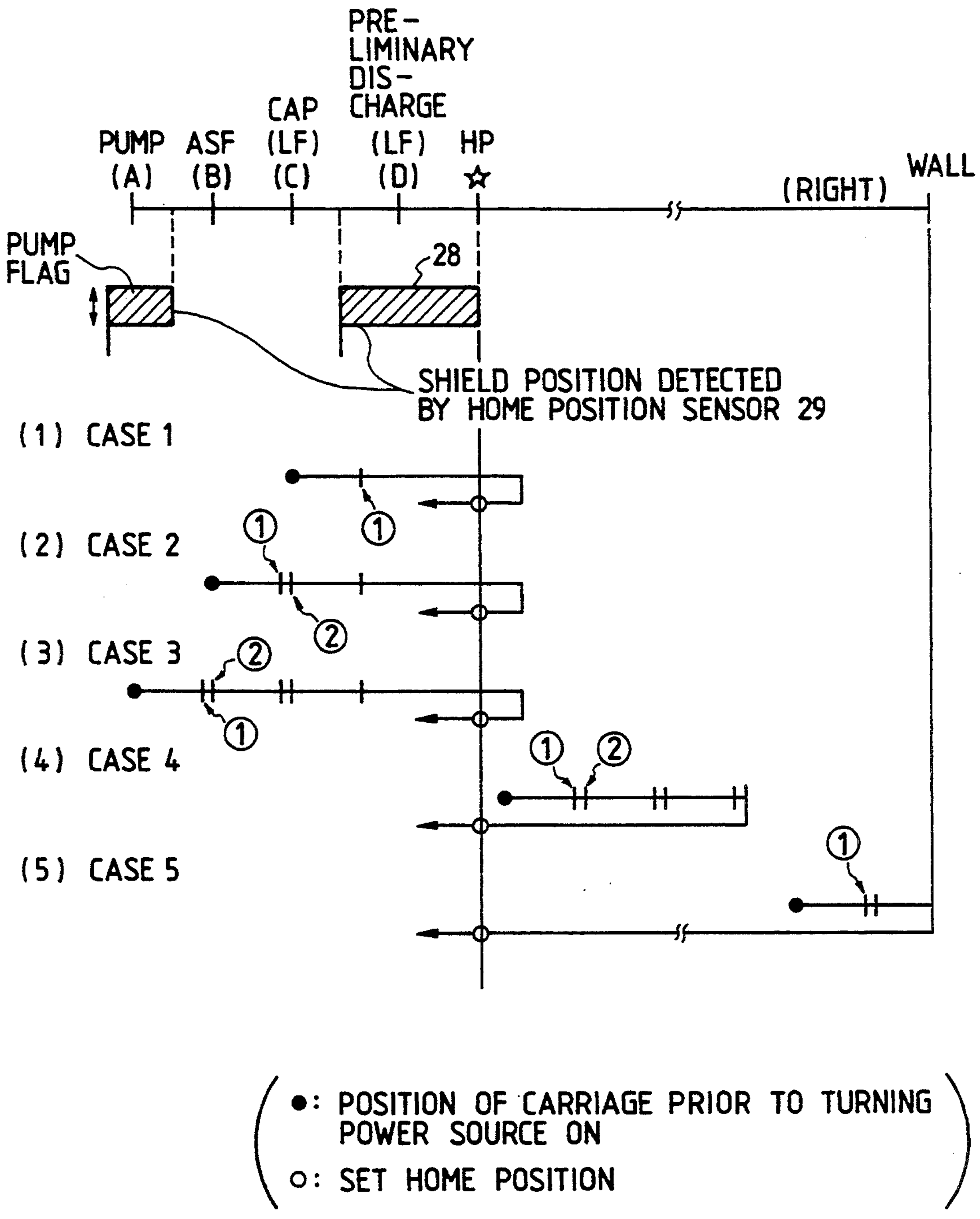
FIG. 19 is a diagram for explaining how the initial operation is changed dependent on different positions of the carriage prior to turning-on of the power source.

As shown FIG. 19, the fixed shutter 28 for blocking off an optical path of the home position sensor 29 of transmission type, for example, mounted on the carriage 2 and being used to set the home position (HP) as a reference position of the carriage is provided to lengthily extend in the direction of movement of the carriage. The fixed shutter 28 is arranged so as to turn on the sensor 29 even when the carriage 2 is near the preliminary discharge position (D). Only in "Case 1", the home position sensor 29 is turned on in Step S30. In this case, as shown in Steps S31 to S33, the carriage 2 is once moved to the right until turning-off of the home position sensor 29 and, thereafter, the motor is rotated through a predetermined number of steps (8 steps in Step S33) to further move the carriage rightward for giving an allowance.

Here, "Case 2" represents the case that the sensor is turned on in Step S30 at the second loop, "Case 3" represents the case that the sensor is turned on in Step S30 at the third loop, and "Case 4" represents the case that the sensor is not turned on in Step S30 even at the third loop. If the sensor is not turned on even at the third loop, then this is judged that the carriage 2 is moved to the right side of the home position sensor shielding plate (fixed shutter) 28 as shown in "Case 4". Incidentally, "Case 5" represents the case that the aimed position has not been reached in Step S22 at the second loop.

Figure 18:
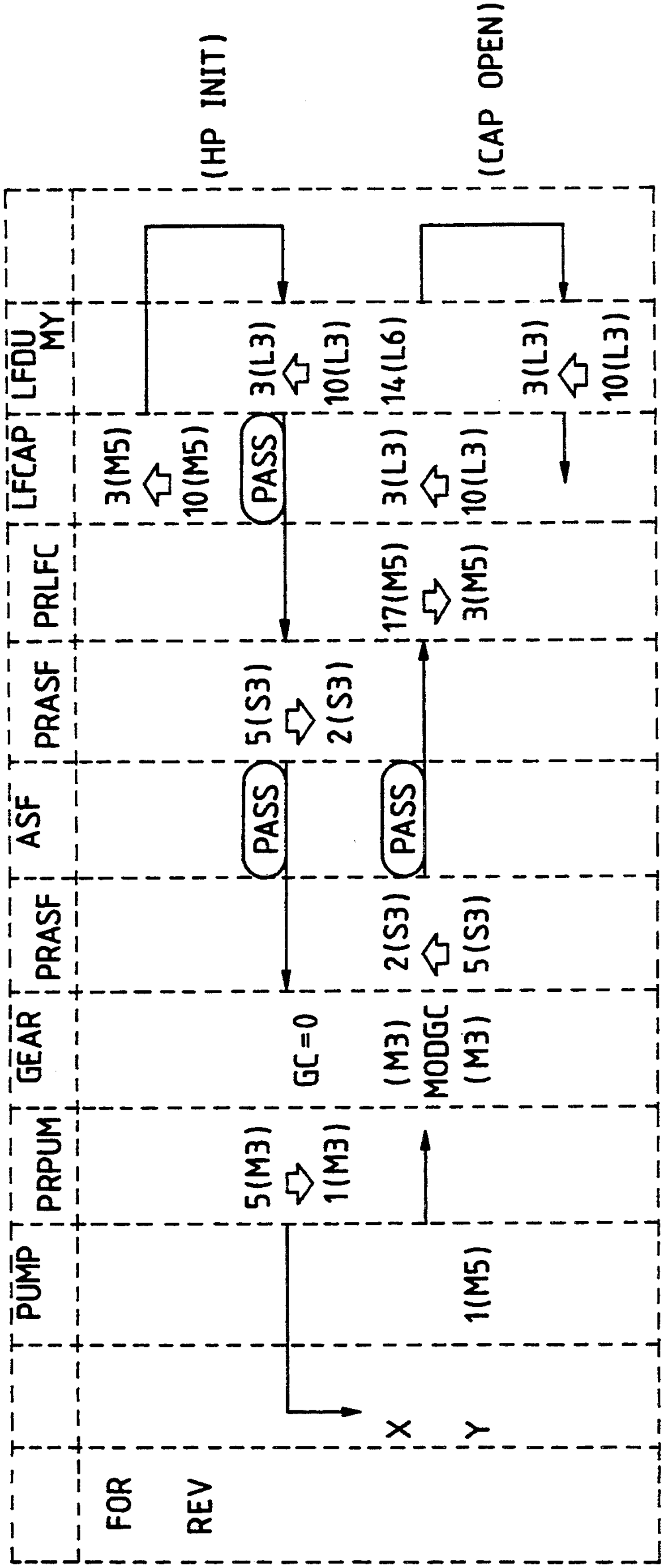
FIG. 18 is a diagram for explaining an operation of the sheet feed motor in the initial operation.

After thus confirming in each case that the carriage 2 has move to the right side of the home position sensor shielding plate 28, the carriage 2 is moved to the left and setting of the position counter is made at the time the carriage passes over the HP position in Steps S35 to S37. Further, in steps S38 and S39, the carriage is moved through several steps and, at the resulting position, the initial operation of a motor circuit is carried out. After that, the restoring operation is performed while making the aforesaid gear switching operation, as shown in FIG. 18, thereby completing the initial operation.

When the power source is turned off, the carriage 2 is usually at the cap position (i.e., the initial position in "Case 1"). In this case, the sensor is turned on at the first loop to shorten the operation time. Furthermore, even if the carriage 2 assumes any position or the position counter in the RAM of the recording apparatus is not yet set before completion of the initial operation, as shown in "Case 1" to "Case 5" by way of example, the initial operation can be performed without causing such a drawback that the gear contact pressure will not be released to make the carriage immobile.

(Other Embodiments)

In the foregoing example shown in FIG. 14, the motor is rotated at the gear adjusting position through the number of steps given by the residual of the division in a direction opposite to the sign. As an alternative, however, the motor may be rotated in the same direction through the number of steps in short of the integer times the number of steps for tooth pitch of the slide gear.

When carrying out the division in FIG. 14, it is made by dividing the value of the gear counter by the number of steps for tooth pitch of the slide gear 44. In the processing like this, however, the final excitation phase of the sheet feed motor at the end of the initial operation after turning on the power source does not become constant. In the case of a 4-phase motor, for example, assuming that the power source is turned on initially at the first phase and turned off at the second phase, the gear is rotated excessively in the same or opposite direction when the power source is turned on next time. In view of the above, by dividing the value of the gear counter by 12 which is a common multiple of 6 which is the number of steps for tooth pitch and 4 which is the number of phases of the motor, the motor excitation phase can also be always matched at the time the slide gear engages the sheet feed output gear. As a result, the excitation is started from the first phase at the time of turning on the power source and ended with the fourth phase at the end of the initial operation. Thus, when the power source is turned off and then turned on, the excitation is started from the first phase in due order, resulting in that the rotation amounts of the gears becomes not excessive and insufficient so as to achieve the predetermined movement. Consequently, even if a series of operations to initialize upon turning-on of the power source and then turn off the power source is repeated any times, the sheet feed output gear 34 is always set to the same position. Thus, when the record sheet is set, the pre-feed position of the record sheet will not be changed.

As an alternative method, during the gear adjustment in FIG. 14, the motor may be rotated through 2 steps in the opposite direction, for example, based on the calculated number of steps for rotation and, thereafter, moved rightward to the pre-cap position where the motor may be rotated forwardly through $17 \div 2$ ($=19$) steps, rather than 17 steps in the above example, for meshing the slide gear 44 with the sheet feed output gear 34. This method can also provide the similar advantageous effect. The 2-step movement in this case is used to effect gear meshing. Specifically, the gear phases are matched to each other through the 2-step movement for the positive gear meshing and the torque is then transmitted to the sheet feed output gear 34, thereby providing the similar advantageous effect as stated above. In this case, however, if the number of steps in the reverse direction exceeds 6 steps, for example, the gears are meshed with each other at a gear position before one step. Accordingly, that number of steps must be five at maximum.

In the above, the present invention has been explained in connection with the example that the closed-loop drive and the stepwise motor drive are switched over based on the counter value showing the predetermined carriage position on the MPU, the example that the stepwise motor drive is performed, particularly, at the wiper position, the example that the stepwise motor drive is performed, particularly, at the gear switching mechanism position, and the example that both the phase switching timing and the PWM duty value are changed over for the stepwise motor drive at the predetermined carriage position on the MPU.

Alternatively, in place of using the counter based on the encoder output signal as a position counting method for the carriage 2, it is also possible to, for example, manage the carriage position by using a counter to count the phase switching timings of the motor itself. Although the above example has been explained as changing the PWM duty value successively in the stepwise motor drive, it is further possible to use another drive method based on current limitations.

Additionally, the above example has been explained as using the stepwise motor drive in a combined manner for the carriage drive motor to scan the recording head. The stepwise motor drive can also be equally applied to a sheet feed drive motor which requires high resolution or which requires a low level of noises.

While the drive torque is adjusted in the above example by changing the PWM duty value for each phase switching, the power value can be changed over by switching a voltage value, etc. with normal current value control and constant voltage drive.

The phase excitation method may be other than the 1-2-phase excitation adopted in the above example.

Other excitation methods such as 3-4- and 2-3-phase excitation methods may be adopted on demand.

The recovery control method is set in the above to firstly increase the force of moving the carriage, secondly lower the speed of moving the carriage, thirdly lower the speed of rotating the gears, and fourthly rotate the gears forwardly and reversely. As an alternative, however, the same one operation may be repeated.

Moreover, although the decision as to whether or not the gear (slide gear) has been completely set at the predetermined position is made in the above example by using the position counter based on the encoder signals while the carriage motor is being driven stepwisely through the preset maximum steps, such decision may be performed by any other suitable method.

(Others)

The present invention is applicable to not only the ink jet recording apparatus as stated above, but also recording apparatuses of other types. In the case of adopting the recording apparatus of ink jet type, particularly, the present invention is extremely effective in recording heads and recording apparatus of bubble jet type proposed by Canon Inc. The reason is because application of the bubble jet technique enables to achieve high density and fine expression in the recording.

Typical constructions and principles of the bubble jet technique are preferably based on the basic principles disclosed in U.S. Pat. Nos. 4,723,129 and 4,740,796, for example. The bubble jet technique can be applied to either on-demand type or continuous type. In the case of on-demand type, the bubble jet technique is particularly effective in a capability of that by applying at least one drive signal, which corresponds to recording information and gives a quick temperature rise beyond the core boiling, to an electro - thermal transducer arranged corresponding to a sheet or liquid path holding a liquid (ink) therein, the electro - thermal transducer generates thermal energy to cause film boiling at the heat acting surface of a recording head, thereby forming an air bubble in the liquid (ink) in one-to-one relation to the drive signal. With growth and contraction of the air bubble, the liquid (ink) is discharged through a discharge opening to form at least one droplet. By generating the drive signal in the form of a pulse, the air bubble can be grown and contracted so promptly and properly that the liquid (ink) is discharged in a preferable manner with superior response. The pulse-shaped drive signal is suitably generated in the manner disclosed in U.S. Pat. Nos. 4,463,359 and 4,345,262. More satisfactory recording can be achieved by adopting the conditions disclosed in U.S. Pat. No. 4,313,124 relating to a temperature rise rate at the heat acting surface.

The construction of the recording head according to the present invention includes the combined construction (linear or right-angled liquid flow path) of discharge ports, liquid paths and electro - thermal transducers disclosed in the Patent specifications cited above, as well as the construction disclosed in U.S. Pat. Nos. 4,558,333 and 4,459,600 relating to a heat acting portion arranged in a bent area. In addition, the advantages of the present invention is also effective in other constructions that a slit common to a plurality of electro - thermal transducers is used as a discharge port for the electro - thermal transducers, as disclosed in Japanese Patent Laid-Open Application No. 59-123670, and that an opening for absorbing a pressure wave of thermal energy is made correspondent to a discharge port. The reason is because the present invention enables to perform the recording reliably and efficiently regardless of any types of recording heads.

The present invention is further effective in an apparatus using a recording head fixed to the body of a serial type apparatus as illustrated above, or a chip type recording head capable of replacement and effecting electrical connection to the apparatus body and ink supply therefrom when fitted to the apparatus body, or a cartridge type recording head in which an ink tank is provided integrally on the recording head itself.

It is preferable to add restoring means, preliminary assist means and other means for a recording head, which are equipped as components in the recording apparatus of the present invention, for the standpoint of further stabilizing the advantages of the present invention. Examples of those means include capping means for the recording head, cleaning means, pressurizing or suction means, preliminary heating means provided by an electro - thermal transducer, and another heating element, or a combination of these members. The provision of a preliminary discharge mode to discharge ink separately from the recording is also effective in achieving the stable recording.

Further, the types and number of recording heads mounted on the apparatus can be changed as required. For example, a single recording head may be provided corresponding to monochromatic ink, or a plurality of recording heads may be provided corresponding to plural kinds of ink different in recording color or density (tone). In other words, the present invention is very effective in recording apparatuses which are operated not only in a single recording mode to make printing in only a principal color like black, for example, but also in a mode producing at least one of composite colors of different color elements and full colors due to mixing of color elements by using any of a single recording head constructed integrally and a combination of plural recording heads.

Moreover, while ink is explained as a liquid in the foregoing embodiment of the present invention, the ink may be ink that is solidified at the room temperature or below and softened or liquefied at the room temperature, or ink that becomes a liquid at the time of applying a recording signal used because ink itself is usually subjected to temperature adjustment within a range of 30° C. to 70° C. in the ink jet type to keep viscosity of the ink in a stable discharge range. The present invention is also applicable to the case of using ink that is solidified in a standing state for the purpose of positively preventing a temperature rise with thermal energy by utilization thereof as energy to cause a status change of the ink from solid to liquid, or preventing evaporation of the ink, and that is liquefied upon application of a recording signal as thermal energy for discharging the liquid ink, or the case of using ink with such property that the ink is first liquefied by thermal energy and already starts solidification at the time of reaching a recording medium. The ink in the above case may be held as a liquid or solid in recesses or through holes of porous sheets as disclosed in Japanese Patent Laid-Open Application No. 54-56847 or No. 60-71260, and arranged to face electro - thermal transducers. Note that the present invention is most effective for the above-stated various kinds of ink when implementing the film boiling technique as mentioned before.

In addition, the ink jet recording apparatus of the present invention may have various forms such as image output terminals for information processing equipment like computers, copying machines combined with readers, etc., and facsimile equipment having transmitting and receiving functions.

According to the present invention, as described above, during the wiping operation to clean the discharge port surface of a recording head by running a carriage in an ink jet recording apparatus, or during the operation to switch over transmission of a drive force at a stop position of the carriage, for example, a motor can be driven in a manner appropriate for the required operation, whereby the motor can be driven at optimum drive conditions for each position. On the other hand, the recording can be performed under closed-loop control in which the motor produce smaller noises and will not be out of synchronism. The resulting optimum control at each position leads to improved reliability of the apparatus.

What is claimed is:

1. A recording apparatus for moving a recording head to make recording scans, said apparatus comprising:

a carriage on which a recording head is mounted;

a stepping motor for moving said carriage;

detecting means for detecting rotation of a rotor of said stepping motor and generating pulse signals according to rotation of the rotor;

drive means for receiving one of a first timing signal and a second timing signal and switching over an excitation phase of said stepping motor;

control means for counting the pulse signals from said detecting means, detecting a position of said carriage according to the counted value and generating the first timing signal in accordance with a predetermined range of the carriage position, the first timing signal performing a stepwise motor drive of said stepping motor at a predetermined excitation-timing and said control means prohibiting the second timing signal from being generated when the first timing signal is being generated; and signal generating means for counting the pulse signals from said detecting means and generating the second timing signal in accordance with the counted value, said signal generating means performing a closed-loop control of said stepping motor when the carriage is located in a printing range which is at least out of the predetermined range of the carriage position.

2. A recording apparatus according to claim 1, wherein said recording head is an ink jet type recording head.

3. A recording apparatus according to claim 2, further comprising a member for, during movement of said carriage, engaging and cleaning a surface of said recording head at an engagement position, the surface having a discharge port for discharging ink therethrough, wherein said control means generates the first timing signal and the stepwise motor drive is selected at the engagement position.

4. A recording apparatus according to claim 2, wherein said ink jet type recording head has an element for generating, as energy utilized for ink discharge, thermal energy to cause film boiling of ink.

5. A recording apparatus according to claim 2, wherein said recording head further includes means for effecting a predetermined operation in the predetermined range of the carriage position, wherein said control means generates the first timing signal and the stepwise motor drive is selected.

6. A recording apparatus for moving a recording head to make recording scans, said apparatus comprising:

a carriage on which a recording head is mounted;

a stepping motor for moving said carriage;

detecting means for detecting rotation of a rotor of said stepping motor and generating pulse signals corresponding to rotation of the rotor;

drive means for receiving one of a first timing signal and a second timing signal and switching over an excitation phase of said stepping motor;

a speed counter for measuring a pulse interval between the pulses from said detecting means;

control means for counting the pulse signals from said detecting means, detecting a position of said carriage in accordance with the counted value and generating the first timing signal according to a predetermined range of the carriage position, the first timing signal performing a stepwise motor drive of said stepping motor and said control means prohibiting a generation of the second timing signal when the first timing signal is being generated and said control means calculating a duty value for pulse width modulation to be supplied to said drive means, in accordance with the interval measured by said speed counter; and signal generating means for counting the pulse signals from said detecting means and generating the second timing signal in accordance with the counted value, said signal generating means performing a closed-loop control of said stepping motor, when the carriage is located in a printing range which is at least out of the predetermined range of said carriage position.

7. A recording apparatus according to claim 10, further comprising a pulse width modulation counter for setting therein a pulse width modulation value necessary for said stepping motor.

* * * * *

UNITED STATES PATENT AND TRADEMARK OFFICE

CERTIFICATE OF CORRECTION

PATENT NO. : 5,416,395 Page 1 of 2

DATED : May 16, 1995

INVENTOR(S) : Soichi HIRAMATSU, et al.

It is certified that error appears in the above-indentified patent and that said Letters Patent is hereby corrected as shown below:

COLUMN 5:

Line 30, "arid" should read --and--.

COLUMN 6:

Line 67, "31 numeral" should read --Numeral 31--.

COLUMN 7:

Line 29, "23C Numeral" should read --Numeral 23C--.

COLUMN 13:

Line 17, "mot;or," should read --motor,--.

UNITED STATES PATENT AND TRADEMARK OFFICE

CERTIFICATE OF CORRECTION

PATENT NO. : 5,416,395 Page 2 of 2

DATED : May 16, 1995

INVENTOR(S) : Soichi HIRAMATSU, et al.

It is certified that error appears in the above-indentified patent and that said Letters Patent is hereby corrected as shown below:

COLUMN 16:

Line 33, " "+26" , " should read --"+26",--;
Line 47, "condition," should read --condition.--;
Line 65, "gear 4,1" should read --gear 44--.

Signed and Sealed this

Tenth Day of October, 1995

Attest:

BRUCE LEHMAN

Attesting Officer

*Commissioner of Patents and Trademarks*